United States Patent
Hafner

(10) Patent No.: US 9,010,076 B2
(45) Date of Patent: Apr. 21, 2015

(54) MOWER FOR MOWING AROUND FENCE AND RAILING POSTS

(76) Inventor: Brandon Hafner, Franklinton, NC (US)

( * ) Notice: Subject to any disclaimer, the term of this patent is extended or adjusted under 35 U.S.C. 154(b) by 127 days.

(21) Appl. No.: 13/572,725

(22) Filed: Aug. 13, 2012

(65) Prior Publication Data

US 2013/0042590 A1  Feb. 21, 2013

Related U.S. Application Data

(60) Provisional application No. 61/523,581, filed on Aug. 15, 2011.

(51) Int. Cl.
*A01D 75/30*     (2006.01)
*A01D 34/86*     (2006.01)

(52) U.S. Cl.
CPC .................................... *A01D 34/866* (2013.01)

(58) Field of Classification Search
USPC .................. 56/6, 10.4, 11.9, 15.3, 16.7, 16.9, 56/320.1, 320.2
See application file for complete search history.

(56) References Cited

U.S. PATENT DOCUMENTS

| | | | |
|---|---|---|---|
| 2,838,901 A | | 6/1958 | Davis |
| 3,115,739 A | * | 12/1963 | Thoen et al. ........................ 56/6 |
| 3,526,083 A | | 9/1970 | Barry et al. |
| 3,715,872 A | * | 2/1973 | Thompson, Jr. ............... 56/10.4 |
| 3,750,376 A | * | 8/1973 | Cioni ............................. 56/10.4 |
| 4,697,405 A | * | 10/1987 | DeWitt et al. .................. 56/10.4 |
| 4,901,508 A | * | 2/1990 | Whatley ......................... 56/10.4 |
| 5,220,773 A | * | 6/1993 | Klaeger ......................... 56/10.4 |
| 5,471,824 A | * | 12/1995 | Neely ............................ 56/10.4 |
| 5,704,201 A | | 1/1998 | Van Vleet |
| 5,960,614 A | * | 10/1999 | Jones ............................. 56/15.2 |
| 6,301,863 B1 | * | 10/2001 | Liebrecht ....................... 56/10.6 |
| 6,591,592 B1 | | 7/2003 | Krimminger |
| 6,959,528 B1 | * | 11/2005 | Scordilis ........................ 56/15.8 |
| 8,316,627 B1 | * | 11/2012 | Fraley et al. .................... 56/10.4 |
| 8,713,904 B1 | * | 5/2014 | Goudy ........................... 56/15.5 |

FOREIGN PATENT DOCUMENTS

FR      2942691 A1      9/2010

OTHER PUBLICATIONS

International Search Report mailed Oct. 26, 2012 in re PCT Application No. PCT/US2012/050705 filed Aug. 14, 2012.

* cited by examiner

*Primary Examiner* — Thomas B Will
*Assistant Examiner* — Mai Nguyen
(74) *Attorney, Agent, or Firm* — Coats and Bennett, PLLC

(57) ABSTRACT

A mower assembly is provided for cutting around a post. A support structure supports the mower assembly in cantilever fashion. The mower assembly includes a plurality of mower units with each mower unit having a rotary blade. Two or more mower units cooperate to engage and cut around a post and, during the process, the entire mower assembly rotates about an axis enabling the mower units to encircle and efficiently cut grass and other vegetation about the post.

8 Claims, 25 Drawing Sheets

US 9,010,076 B2

MOWER FOR MOWING AROUND FENCE AND RAILING POSTS

This application claims priority under 35 U.S.C. §119(e) from the following U.S. provisional application: Application Ser. No. 61/523,581 filed on Aug. 15, 2011. That application is incorporated in its entirety by reference herein.

FIELD OF THE INVENTION

The present invention relates to mowers and more particularly to mowers for mowing around fence posts.

BACKGROUND OF THE INVENTION

The problems associated with mowing around fence posts and other vertical posts are well documented. There are numerous mower designs that have attempted to solve this problem. But few mower designs have been successful. There are mowers that are designed to mow around a fence or railing post. Few, if any, of these mowers make a clean and neat cut completely around the fence post or post railing.

SUMMARY OF THE INVENTION

The present invention relates to a mower design that produces a clean and neat cut completely around a post. The mower of the present invention includes a support structure and a mower assembly secured and supported by the support structure. The support structure is adapted to be mounted to a tractor or other prime mover. The mower assembly includes a plurality of mower units with each mower unit having a rotary blade. To mow around a post, the post is received between two mower units and the mower assembly rotates causing the mower units to bodily rotate around the post, producing a clean and neat cut around the post.

In one embodiment, the mower assembly includes four mower units. In operation, two of the mower units engage and cut around a post and in the process the mower assembly rotates approximately 180° to where the two mower units that formerly occupied a front portion of the mower assembly now occupy a rear portion of the mower assembly. The two other mower units that formerly occupied the rear portion of the mower assembly now occupy the front portion of the mower assembly and are appropriately positioned to engage the next successive post.

Other objects and advantages of the present invention will become apparent and obvious from a study of the following description and the accompanying drawings which are merely illustrative of such invention.

DESCRIPTION OF EXEMPLARY EMBODIMENTS

Figure 1:
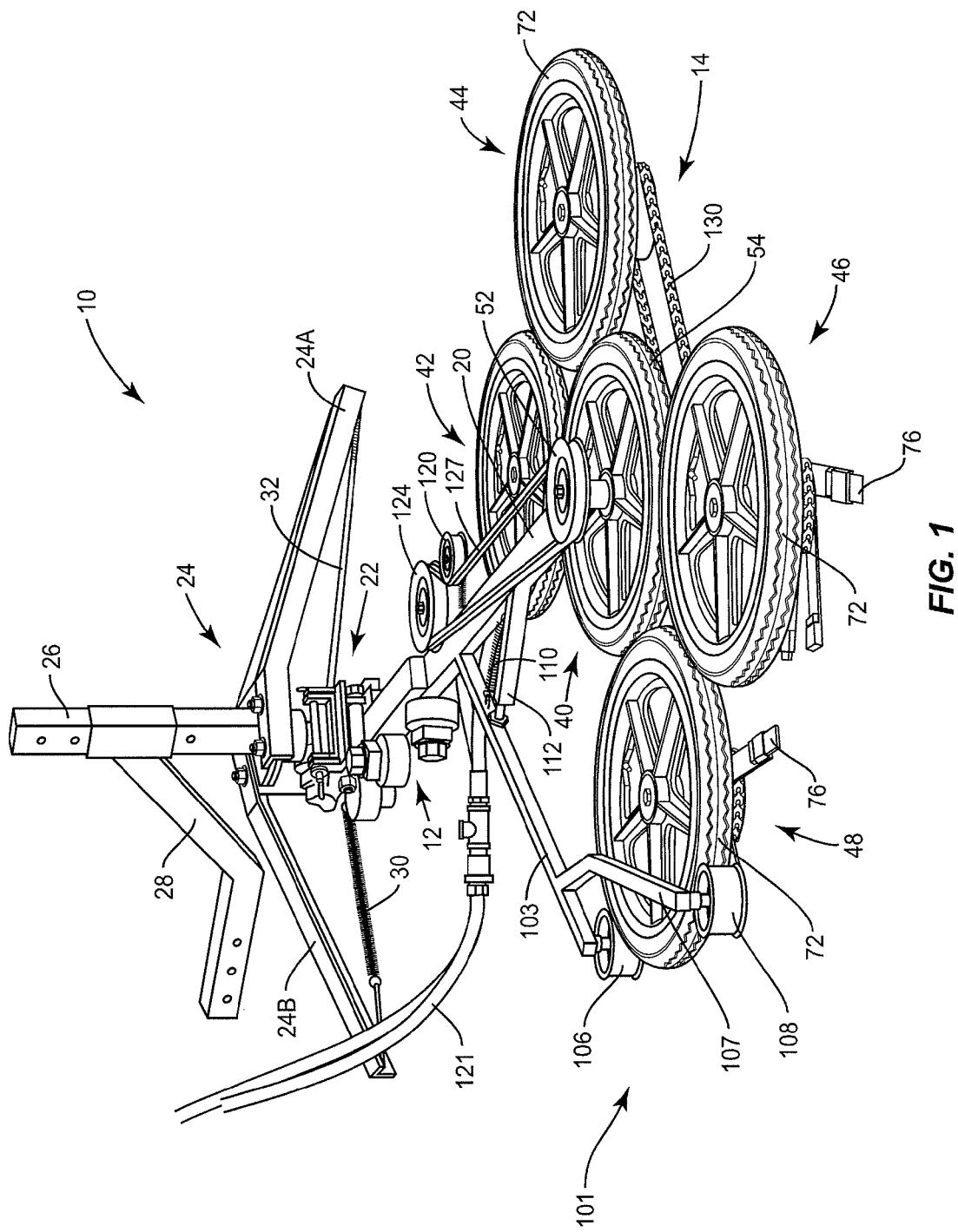
FIG. 1 is a perspective view of the mower of the present invention.
Figure 1A:
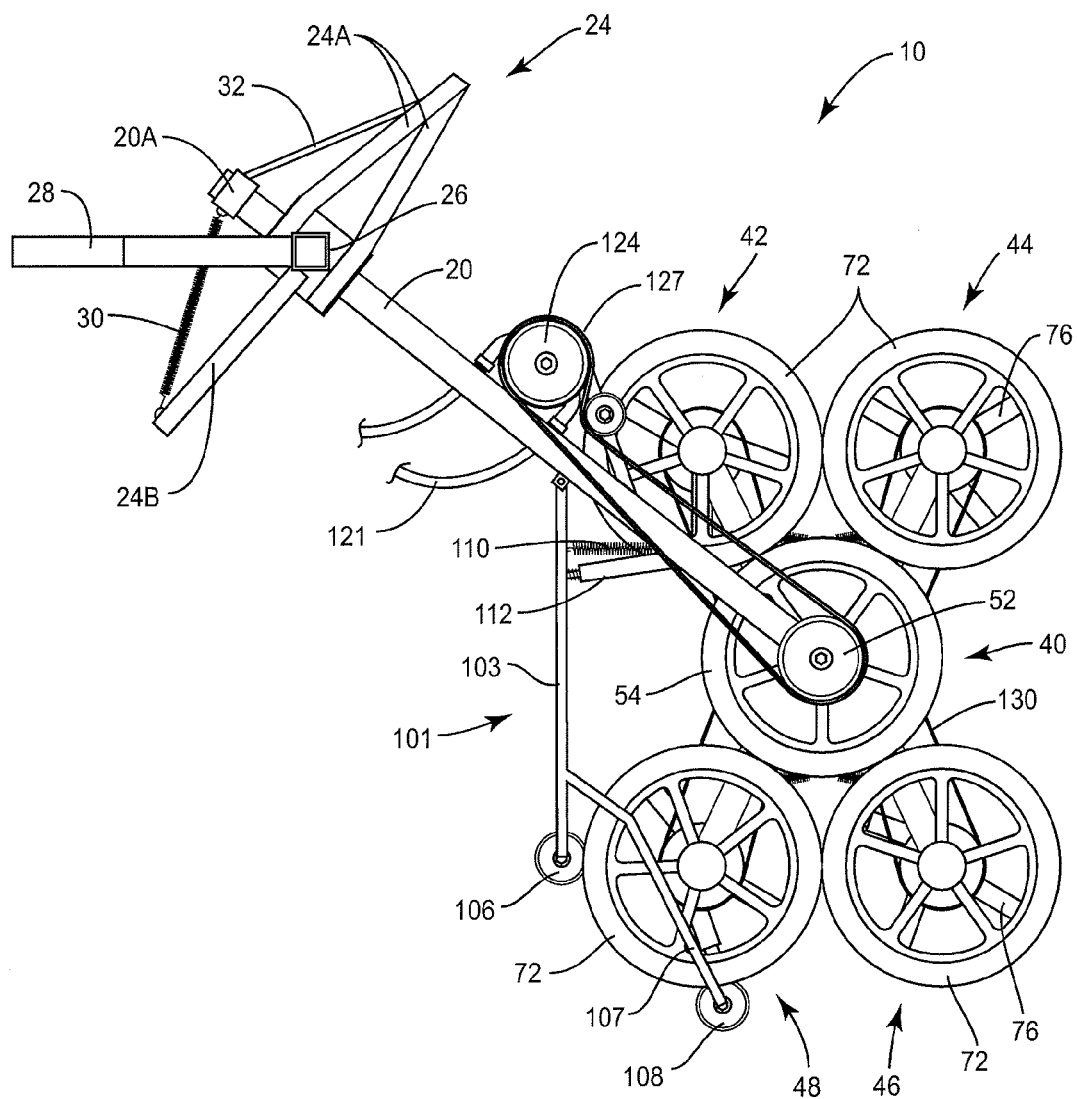
FIG. 1A is a plan view of the mower of the present invention.
Figure 1B:
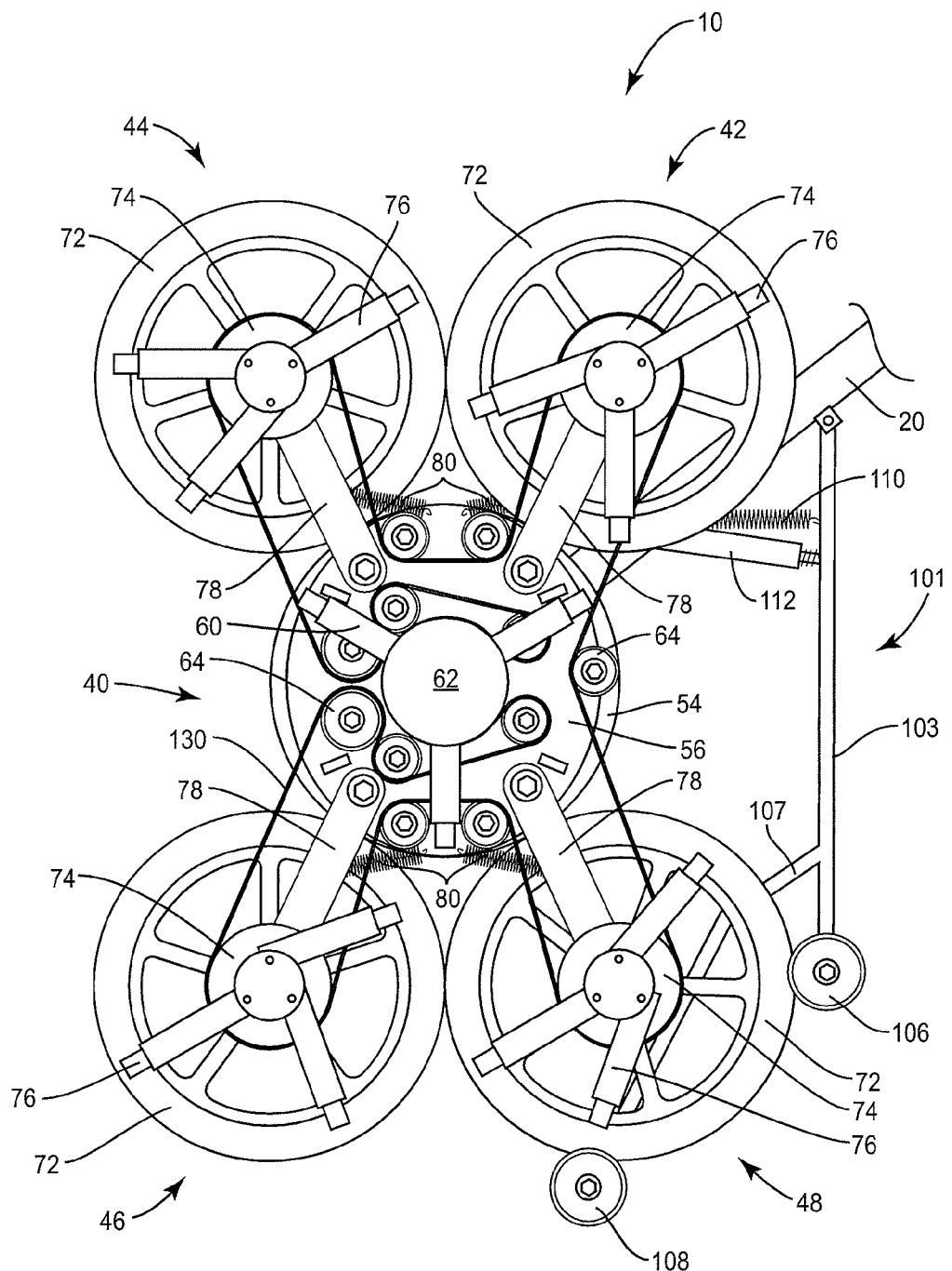
FIG. 1B is a plan view of a portion of the underside of the mower of the present invention.

With further reference to the drawings, the mower of the present invention is shown therein and indicated generally by the numeral 10. As discussed above, the mower 10 is designed to cut around posts such as fence posts and posts that support highway railings. Mower 10 includes a support structure indicated generally by the numeral 12. See FIGS. 1 and 1A. Support structure 12 is designed to attach to a tractor and to extend outwardly from the tractor. In one particular embodiment, the support structure 12 is designed to attach to the tractor and project outwardly from one side thereof. Secured to an outer end portion of the support structure 12 is a mower assembly indicated generally by the numeral 14. Mower assembly 14 is supported by the support structure 12 in cantilever fashion. As seen in FIGS. 1, 1A and 1B, the mower assembly 12 includes a plurality of wheel assemblies or mower units. As will be discussed herein, each wheel assembly includes a blade associated therewith for cutting grass and other vegetation disposed around a post.

First the support structure 12 will be discussed. Support structure 12 includes an elongated arm 20. Arm 20 includes an outboard end portion that attaches to the mower assembly 14. In addition arm 20 includes an inboard end portion that attaches at least indirectly to a tractor or other prime mover. The inboard end of the arm 20 is slidably contained in a receiver indicated generally by the numeral 22. See FIGS. 1 and 1A. Receiver 22 can be constructed in various ways. The function of the receiver is to receive and hold the inboard end portion of arm 20 and to allow the arm to move or slide back and forth within the receiver. In the embodiment disclosed herein, the receiver 22 includes a series of rollers for engaging the arm 20 and generally confining the arm. The rollers include side, top and bottom rollers and the rollers are spaced to receive the inboard end portion of the arm 20. Receiver 22 is pivotally mounted to a mounting frame indicated generally by the numeral 24. This enables the receiver 22 to pivot and also allows the arm 20 to swing back and forth as the receiver pivots.

The mounting frame 24 supports the receiver 22 and permits the receiver to rotate about a generally vertical axis. Mounting frame 24, as seen in FIGS. 1 and 1A includes a pair of members 24A. Further the mounting frame 24 includes another member 24B. Extending upwardly from the mounting frame 24 is a vertical bar 26. There is provided a connecting arm 28 that is slidably adjustable on the vertical bar 26 and which extends from the vertical bar for connection to a tractor or other prime moving source. As seen in FIG. 1, the receiver 22 is suspended below the mounting frame 24.

As seen in FIG. 1A, arm 20 includes an outer stop 20A. Stop 20A is fixed on arm 20 and restricts the outward movement of the arm 20. That is, at a selected point, the stop 20A will engage the receiver 22 and prevent the arm 20 from moving further outward, or generally left to right as viewed in FIG. 1A. Secured to the stop 20A is a spring 30. Spring 30 extends from the stop 20A to the member 24B. Spring 30 has a tendency to bias the arm 20 toward an extended position with respect to the receiver 22. In addition a guide member 32 is pivotally interconnected between stop 20A and the mounting frame 24. As will be appreciated from subsequent portions of the disclosure, as the arm 20 is extended and retracted with respect to the receiver 22, the guide member 32 will oscillate back and forth.

As briefly mentioned above, the mower assembly 14 is supported in cantilever fashion on the outboard end of arm 20. As shown in FIGS. 1 and 1A, the mower assembly 14 basically includes five wheel or mower units. These include a center wheel or mowing unit and four peripheral or outer mowing units. In some cases these subassemblies of the mower assembly 14 is referred to as a wheel assembly and in other cases they may be referred to as a cutting or cutter assembly.

Turning now to a discussion of the five mower units, there is provided a center mowing unit indicated generally by the numeral 40. Projecting outwardly from the center mowing unit 40 are four peripheral mowing units indicated generally by the numerals 42, 44, 46 and 48. See FIG. 1A.

With respect to center mowing unit 40, the same includes a main drive shaft 50 which extends through the outboard end of the arm 20. An opening is provided in the outboard end of arm 20 and shaft 50 is rotatively journaled therein. By rotatively journaled it is meant that the shaft rotates within the opening in the outboard end of arm 20 and that the arm 20 is effectively supported on the shaft. Shaft 50 effectively couples the mower assembly 14 to the support structure 12. Fixed to shaft 50 is an upper sheave 52. Disposed below the upper sheave 52 is a wheel 54. Wheel 54 is rotatively journaled on the shaft 50 such that the shaft 50 can turn independently of the wheel. Disposed below the wheel 54 is a lower plate 56. Shaft 50 extends through the wheel 54 and through the lower plate 56. Shaft 50 is rotatively journaled in the plate 56. This means that the shaft 50 can rotate within an opening in the plate but that the plate is supported on the shaft. Secured or fixed to the shaft 50 below the lower plate 56 is a lower drive sheave 58. Then secured or fixed to the shaft 50 below the lower sheave 58 is a blade 60. Finally, as particularly shown in FIG. 1B, disposed below the blade 60 and secured to the shaft 50 is a bumper 62. Bumper 62 can be fixed or journaled to the shaft 50.

As seen in FIG. 1B, the underside of the lower plate 56 includes a series of idlers 64. Idlers 64 are secured to the bottom of the plate 56 and as will be discussed subsequently herein are utilized to guide a drive belt 130 that is effective to drive the outer or peripheral cutting assemblies 42, 44, 46 and 48.

Now attention will be directed at the individual peripheral mowing units 42, 44, 46 and 48. Since each of these mowing units is similar in construction and operation, a description of one will suffice for all. Each peripheral mowing unit 42, 44, 46 and 48 includes a drive shaft 70. Journaled on the drive shaft 70 is a wheel 72. Fixed to the drive shaft 70 underneath the wheel 72 is a sheave 74. Further fixed to the shaft 70 below the sheave 74 is a cutting blade 76. A support arm 78 is journaled on the shaft 70 and extends inwardly toward the center mowing unit 40. Support arm 78 is pivotally connected to the plate 56 that forms a part of the center mowing unit 40. Thus it is appreciated that each peripheral mowing unit can swing back and forth about the axis of a pivot pin or connecting pin that connects the support arm 78 to the plate 56 of the center mowing unit 40. A spring 80 extends between the support arm 78 and the plate 56. This is shown in FIG. 1A. Spring 80 biases the support arm 78 and in turn the peripheral or outer cutter assembly such that in a normal no load conditions the four outer mowing units 42, 44, 46 and 48 are disposed as shown in FIG. 1A. That is in the no load position, the forward most mowing units 42 and 44 are biased to a position such that their respective wheels 72 engage. The same is true for the rear most mowing units 46 and 48. Again see FIG. 1A.

An alignment assembly is incorporated into the mower 10 and is indicated generally by the numeral 101. See FIGS. 1 and 1A. The alignment assembly 101 includes a main arm 103 that is pivotally mounted to the arm 20 and projects generally rearwardly therefrom. A secondary arm 107 is secured to arm 103 and extends therefrom. A pair of idlers 106 and 108 is rotatively mounted to the terminal ends of arms 103 and 107. As seen in the drawings, idlers 106 and 108 are operative to engage the wheels 72 of the respective outer mowing units 42, 44, 46 and 48 during the operation of the mower 10. Further the alignment assembly 101 includes a spring 110 that is operatively connected between arm 103 and arm 20. Spring 110 is utilized to bias the alignment assembly 101 into engagement with the respective wheels 72 during the cutting operating. A stop 112 also extends between the arm 20 and the arm 103 to effectively limit the counterclockwise movement of the alignment assembly 101, as viewed in FIG. 1A for example.

The mower 10 of the present invention is provided with a drive system. Various drive systems can be utilized and incorporated into the mower 10. In the example shown herein, the drive system utilizes the hydraulic system of a tractor or prime mover for providing power for driving the respective mowing units. As seen herein, the drive system includes a hydraulic motor 120 that is mounted adjacent the arm 20. A pair of hydraulic lines 121 leads to the hydraulic motor 120 and is typically connected to the hydraulic system of the tractor or prime mover. A drive sheave 124 is connected to the hydraulic motor 120. A main drive belt 127 is trained around the drive sheave 124 and also trained around the drive sheave 52 of the center mowing unit 40. Therefore, it is appreciated that power generated by the hydraulic motor 120 is transferred via belt 127 to sheave 52 and shaft 50 of the center mowing unit 40.

Viewing FIG. 1B, it is seen that a second drive belt 130 is utilized to drive the respective outer cutting assemblies 42, 44, 46 and 48. Note in FIG. 1B how the second drive belt 130 is trained around the respective sheaves 74 and the various idlers 64 disposed on the underside of plate 56. It is appreciated that as the main drive shaft 50 of the center mowing unit 40 is driven, power is effectively transferred from the center mowing unit 40 to each of the peripheral or outer cutting assemblies 42, 44, 46 and 48.

Figure 2A:
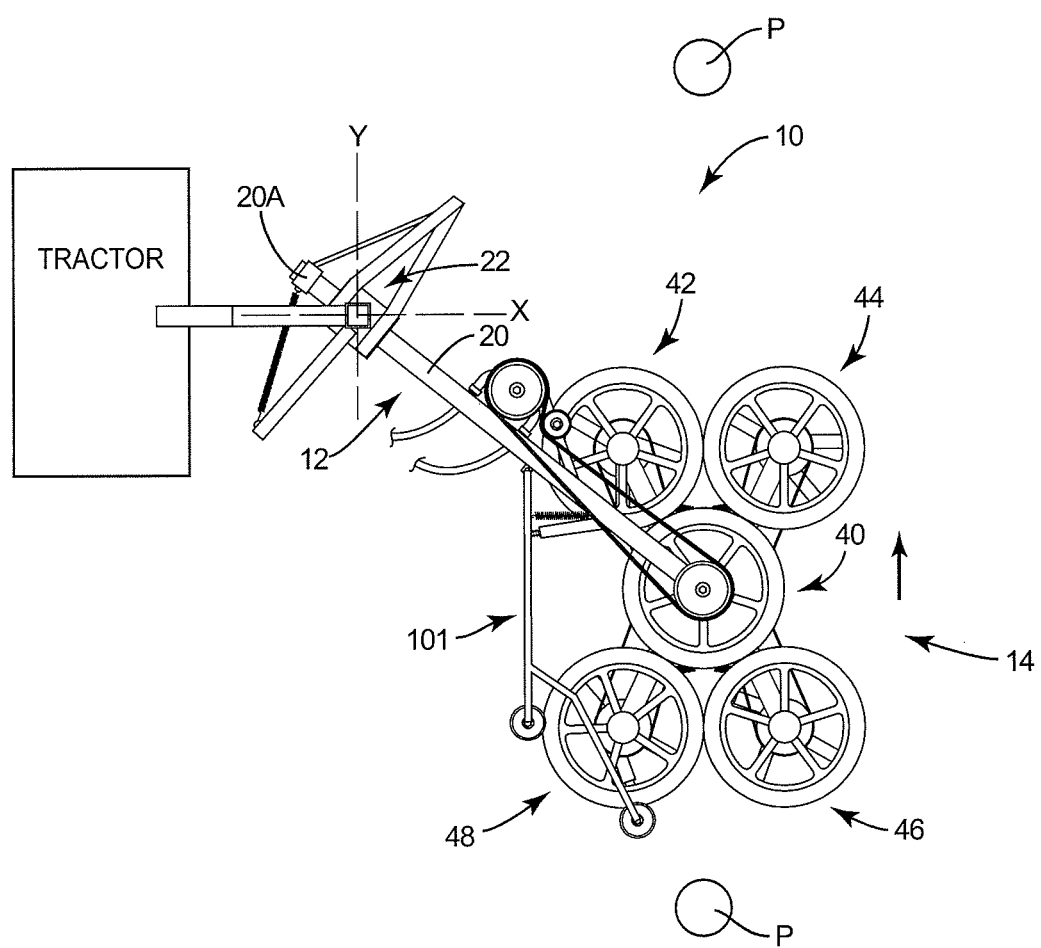
FIGS. 2A-2I are a sequence of views showing the mower of the present invention mowing or cutting around a post.
Figure 2B:
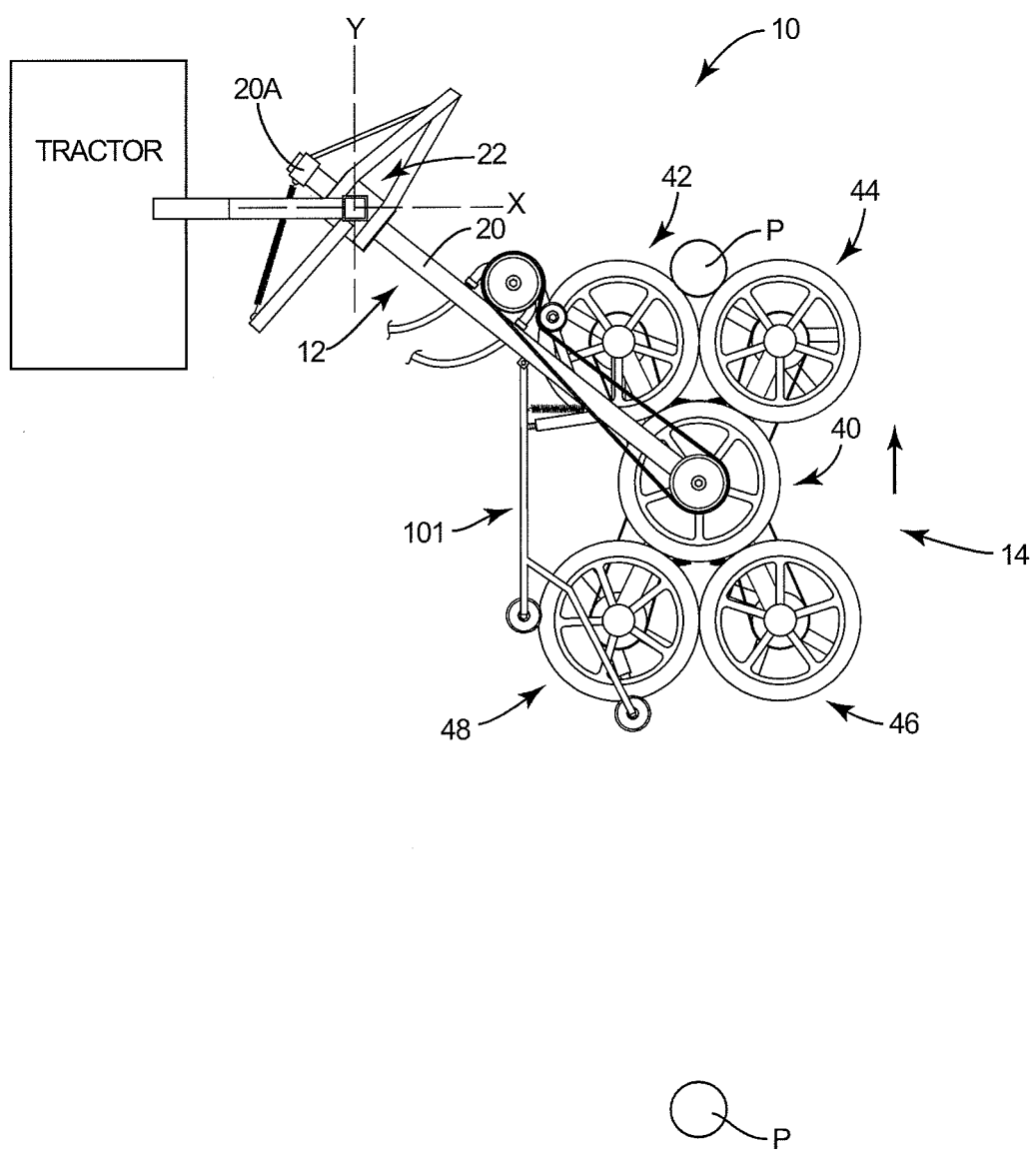

FIGS. 2A-2I show how the mower 10 operates with respect to a post P. In a typical application, the mower 10 as shown in FIG. 2A is mounted to the right side of a tractor and is disposed on the right side of the tractor as the tractor traverses the ground. In FIG. 2A, it is seen that the mower 10 is generally aligned with an oncoming post P. The idea is to align the mower 10 such that the post P will be in alignment with the interface created by the engagement of the two forwardmost mowing units 42 and 44. Note in FIG. 2B where the mower 10 has advanced to where the post P engages both mowing units 42 and 44 and note that the post P at this position is generally aligned with the center of the center mowing unit 40.

Figure 2C:
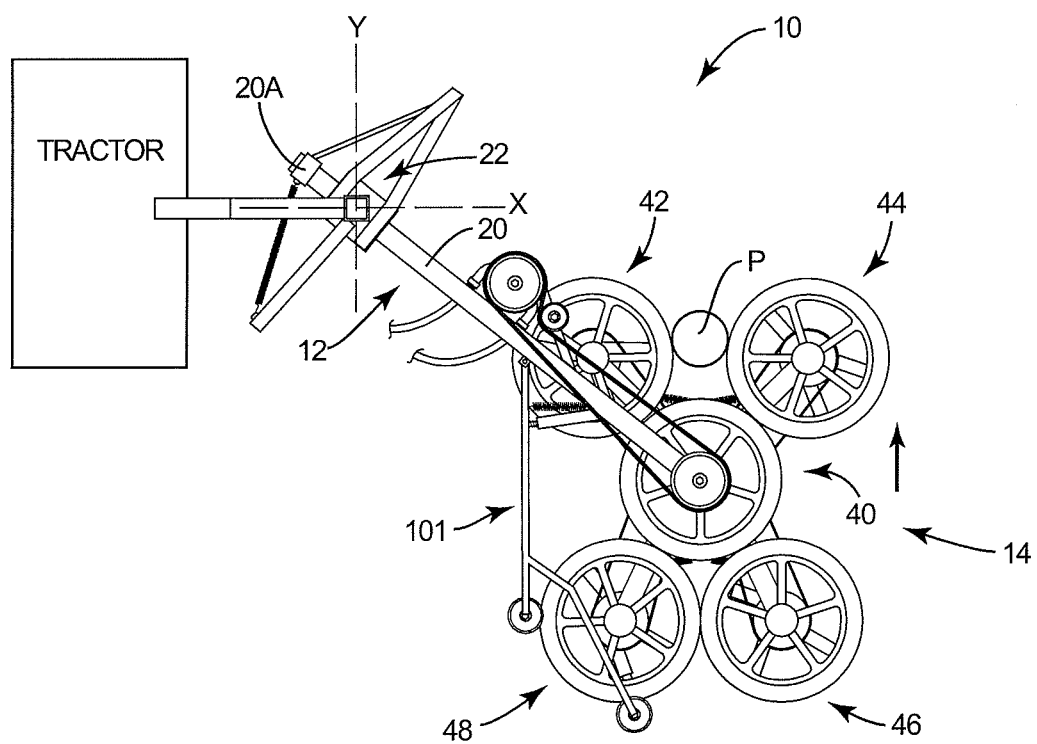
Figure 2C:
Figure 2D:
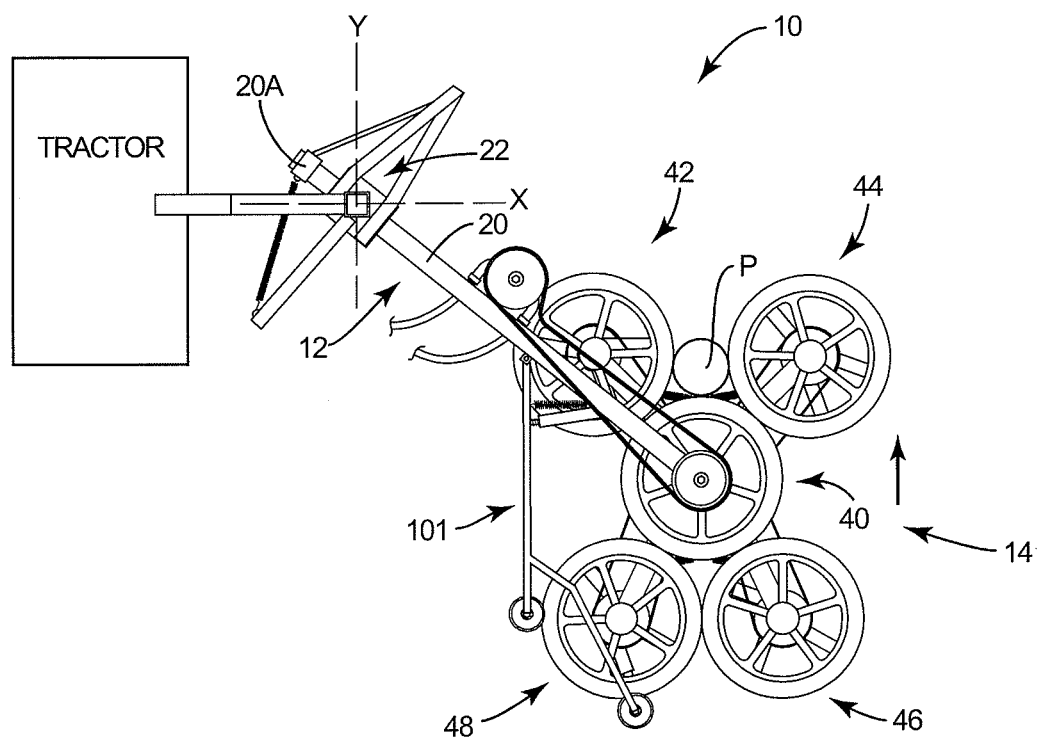
Figure 2D:
Figure 2E:
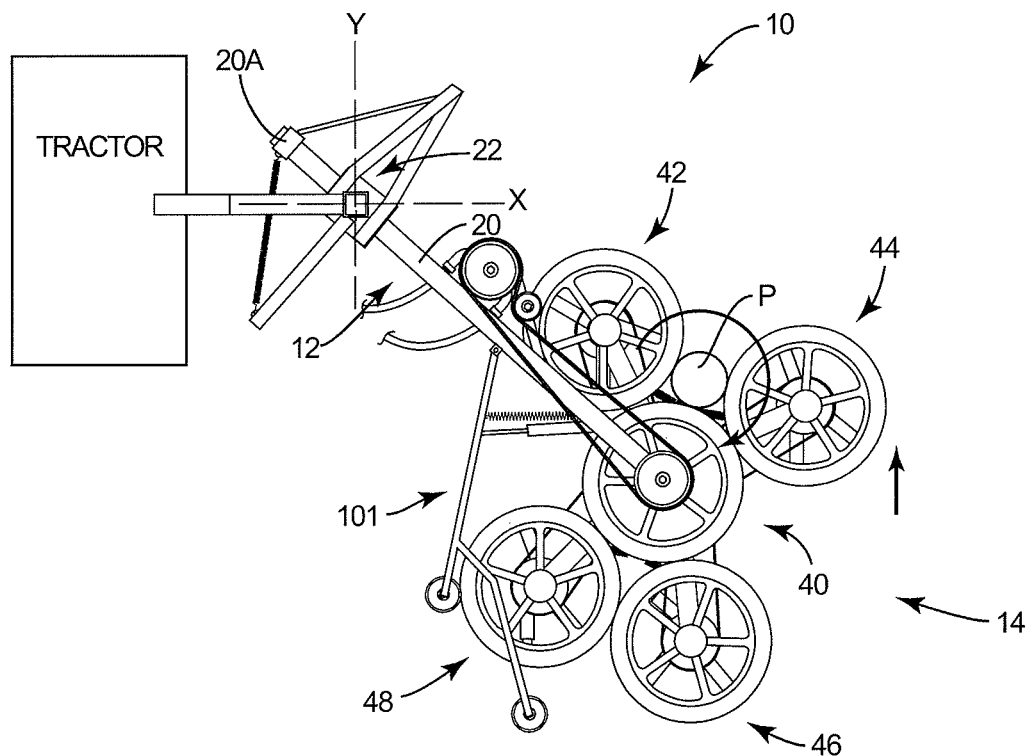
Figure 2E:
Figure 2F:
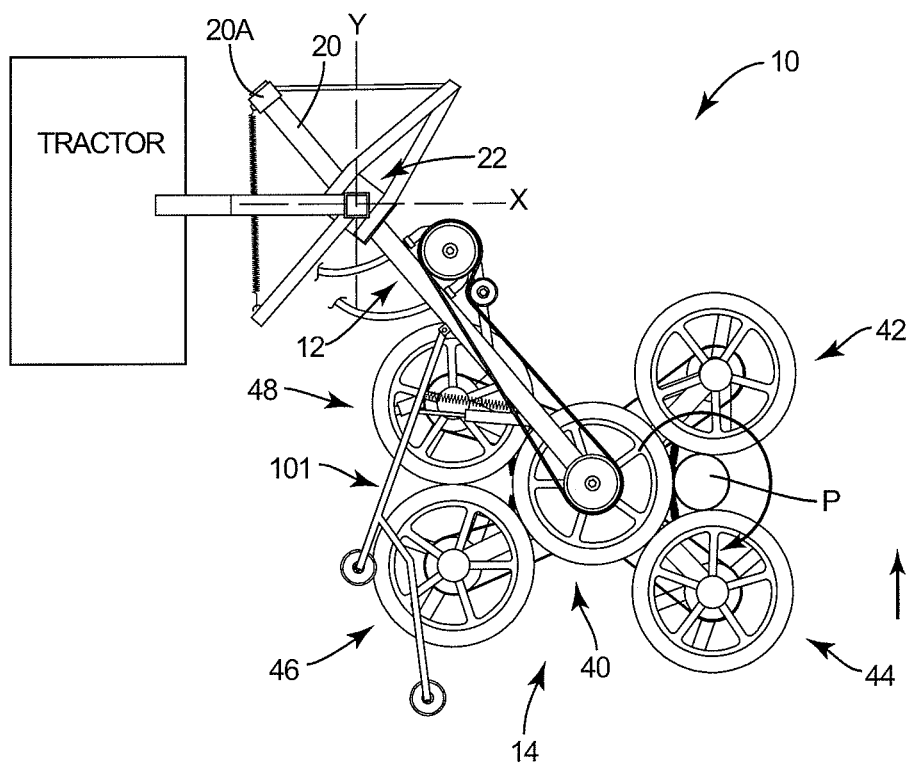
Figure 2F:
Figure 2G:
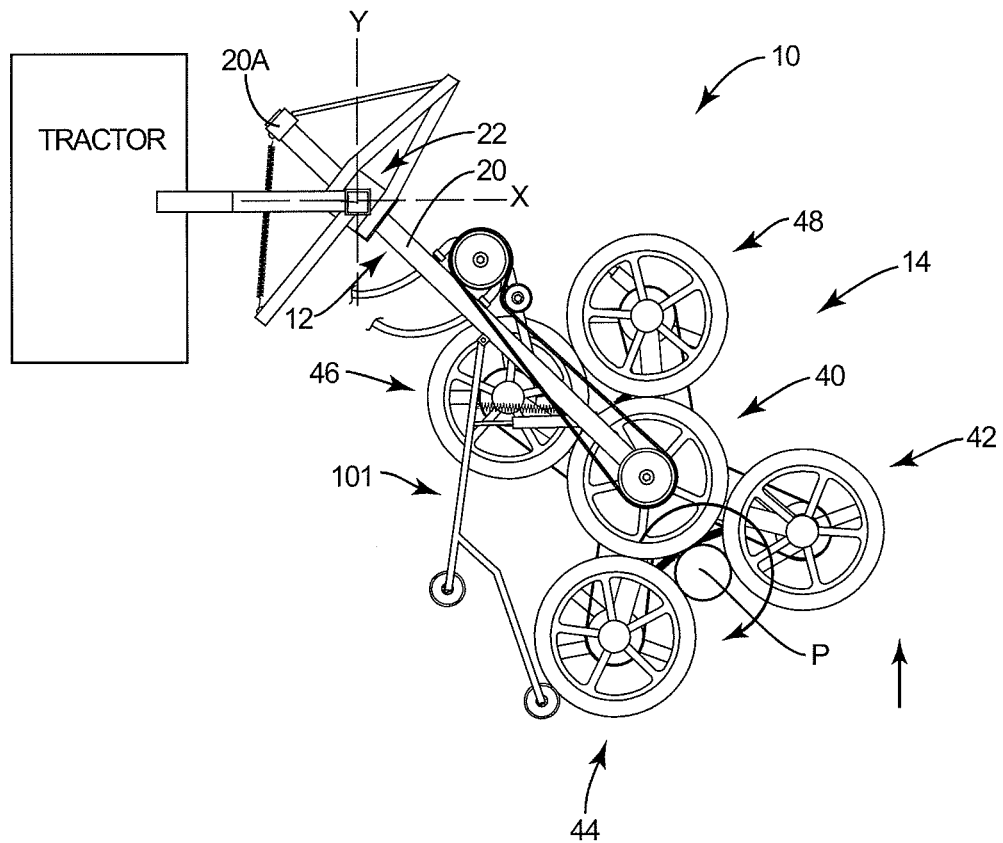
Figure 2G:
Figure 2H:
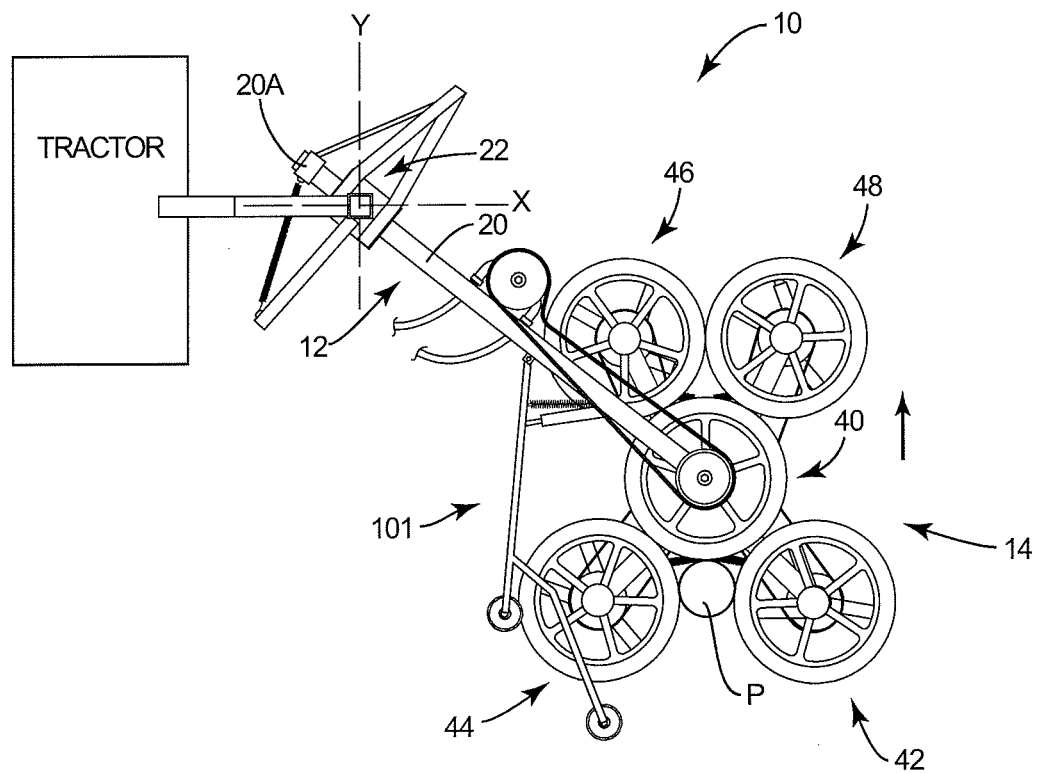
Figure 2H:
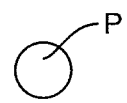
Figure 2I:
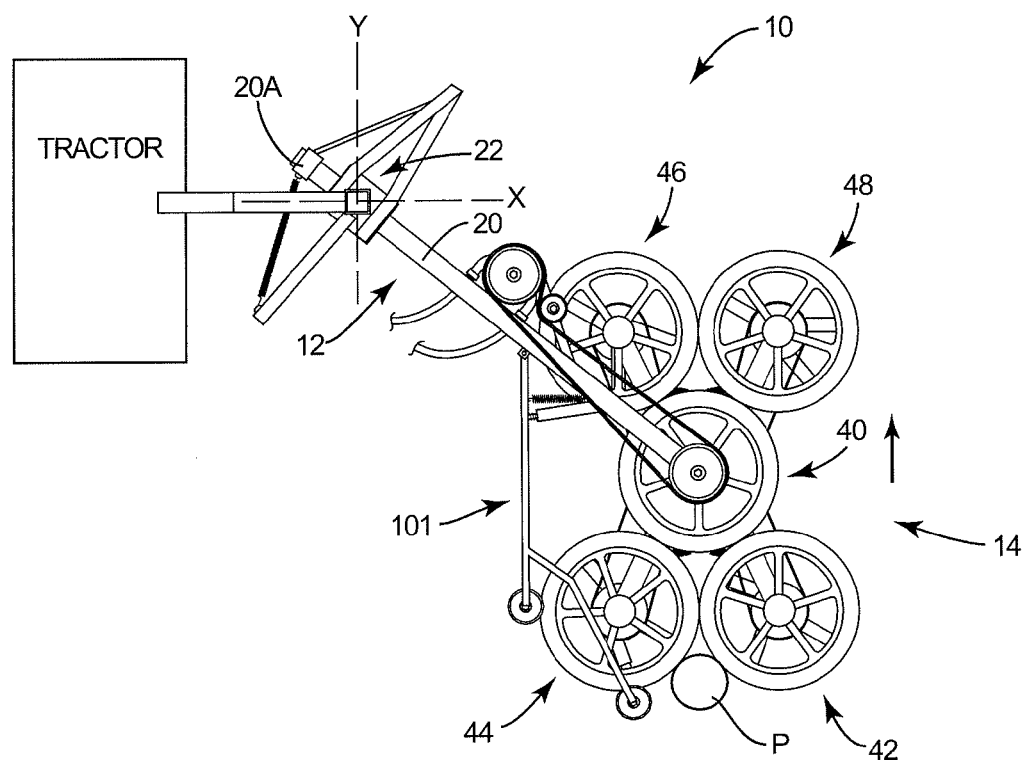
Figure 2I:
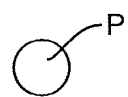
Figure 3:
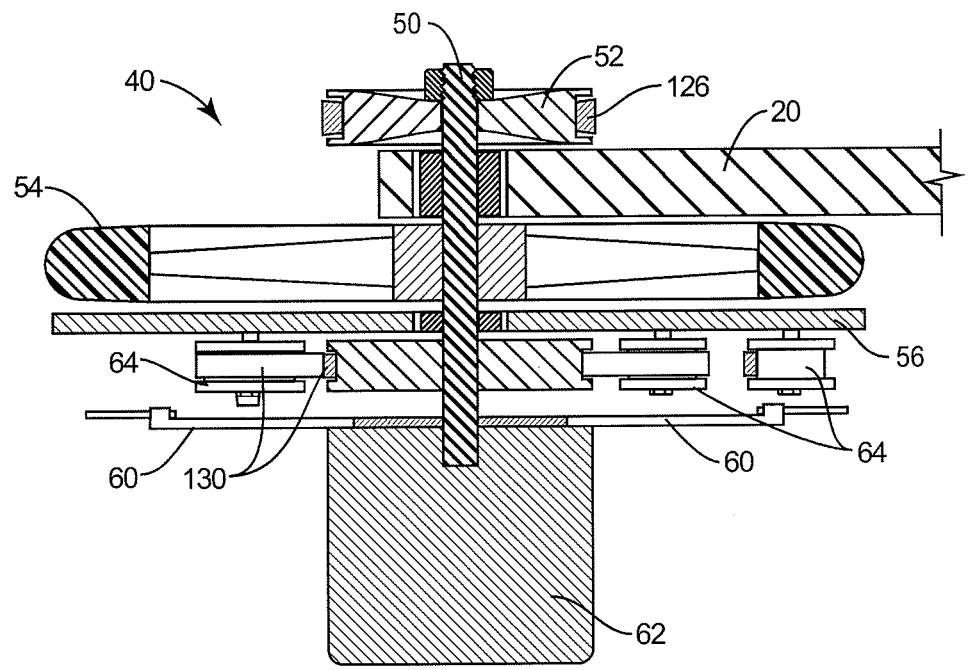
FIG. 3 is a cross sectional view of a center mower unit of the mower.
Figure 4:
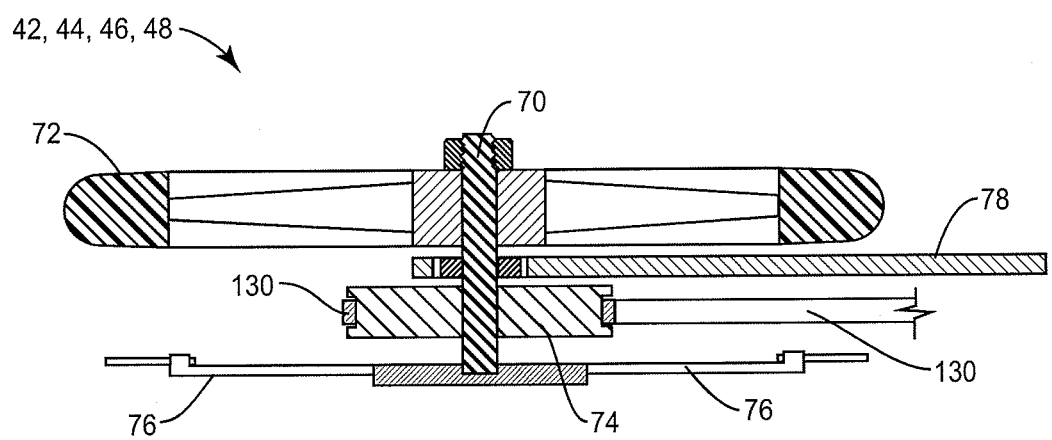
FIG. 4 is a cross sectional view of an outer mower unit of the mower.

Turning to FIG. 2C, the mower 10 has further advanced. Post P has engaged the two forward wheels 72 and caused the two forward mowing units 42 and 44 to spread open. In this position, the blades 76 associated with the forward most mowing units 42 and 44 effectively cut grass on both sides of the post P. Eventually the mower 10 will advance to where the post P is engaged by three wheels, the two wheels 72 of the mowing units 42 and 44 as well as the center wheel 54. This is shown in FIG. 2D. At this point all three mowing units 40, 42, and 44 are effectively cutting around the post P. At this point, the arm 20 is still in its fully extended position. That is stop 20A engages the receiver 22. As the mower 10 further advances forward from the position shown in FIG. 2D, the outer cutting assemblies 42, 44, 46 and 48 start to rotate around the center mowing unit 40. This is illustrated in FIG. 2E. Because of the geometry that exists between the support structure 12 and the mower assembly 14, when the post P assumes the position shown in FIG. 2E, the arm 20 rotates at least slightly clockwise as viewed in FIG. 2E and the arm begins to slightly retract into the receiver 22. This gives rise to clockwise movement of the outer mowing units 42, 44, 46 and 48. Thus as the mower 10 advances forward from the position shown in FIG. 2E, the outer cutting assemblies 42, 44, 46 and 48 continue to rotate clockwise around the center mowing unit 40. In this process, the blades 76 associated with the outer mowing units 42 and 44 as well as the blade 60 associated with the center mowing unit 40 continue to cut around the post P. In FIG. 2F, the position of the arm 20 has reached generally a maximum retracted position. From this point on, as the mower 10 moves forward, the arm 20 will tend to extend. This is illustrated in FIG. 2G. Note as the mower 10 advances forward from the position shown in FIG. 2F to the position shown in FIG. 2G that the outer mowing units 42 and 44 have now advanced to a position generally between the 3 o'clock and 6 o'clock positions. All this time, the three mowing units 40, 42 and 44 are cutting around the post P. Finally, in FIG. 2H a final position is reached where the former leading mowing units 42 and 44 are now the trailing mower units. Still the post P is engaged with all three mowing units 40, 42 and 44.

As the mower continues to move forward from the position shown in 2H it is see that as the post P is cleared that the spring biased support arms 78 will bias and bring the two cutting assemblies 42 and 44 back to a home position.

In this position, the former trailing mowing units 46 and 48 now assume a leading orientation as they are now disposed in the front of the mower 10. They in turn will take on the next succeeding post P.

It is appreciated that the wheels 72 and 54 of the respective mowing units act to precisely space the respective blade 60 and 76 from the post P. This allows precision cutting around the post P. Unlike some mowers of the prior art, the mower assembly 14 is effective to cut completely around the post. Indeed because of the nature of the design certain areas around the post are cut multiple times by different cutting assemblies during a single operation on a post.

In the embodiment illustrated in FIGS. 1-4 and discussed above, the mower 10 is shown with four outer mowing units 42, 44, 46, and 48. It should be appreciated that the mower 10 could be provided with just two outer mowing units. In this case, the two outer mowing units cooperate with the center mowing unit 40 to cut around a post P. In this case, once a post P has been completely cut around such as shown in FIG. 2I, then the two outer mowing units would be required to rotate 180° so as to be disposed about the front of the mower 10 so as to be in a position to operate on the oncoming post P. Thus, the major difference between this embodiment and the embodiment discussed above, is that the two outer cutting assemblies would have to be rotated to the front of the mower 10 after completing a cutting operation so as to be in a position to operate on the next oncoming post P.

Figure 5:
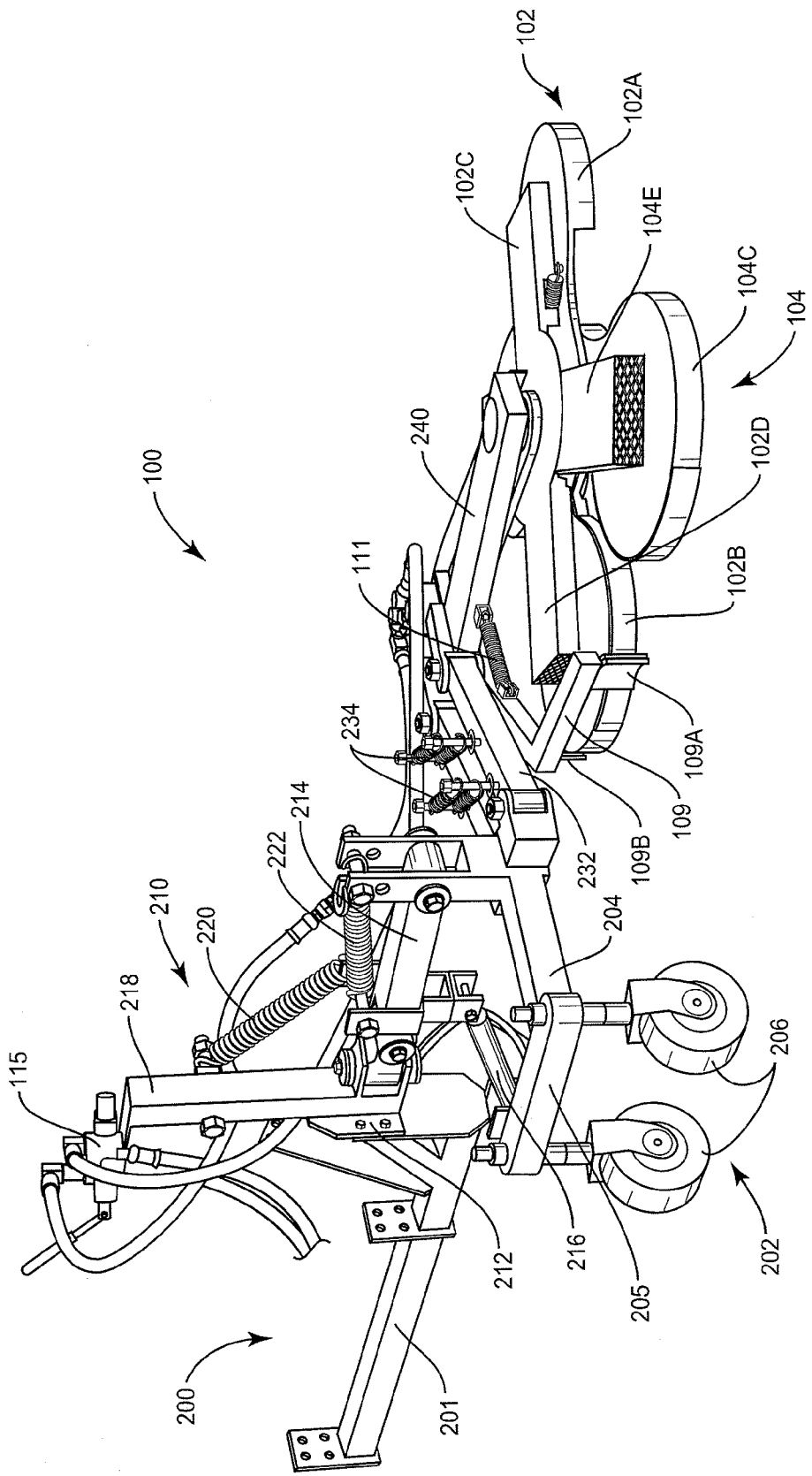
FIG. 5 is a perspective view of a second embodiment of the mower of the present invention.
Figure 5A:
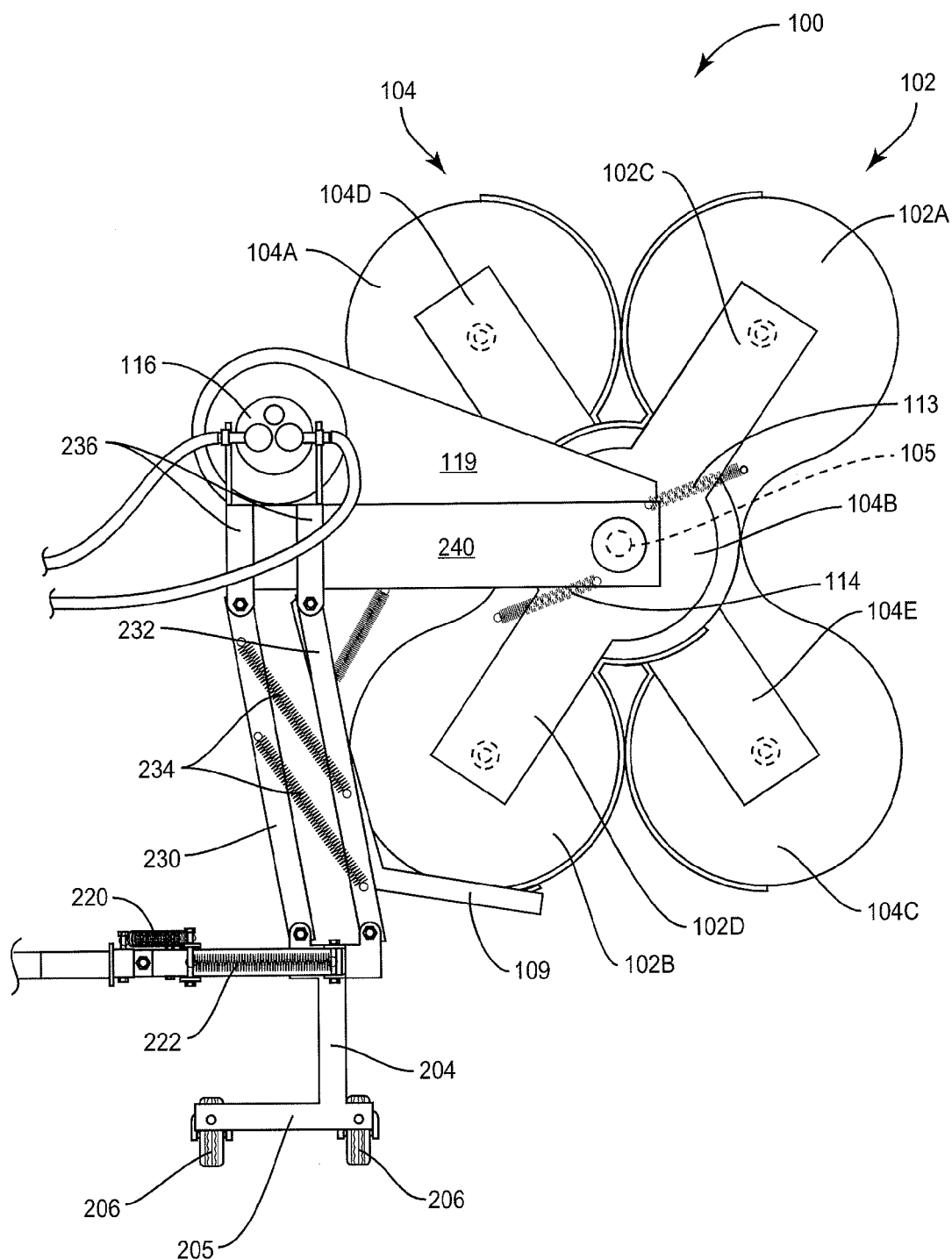
FIG. 5A is a top plan view of the mower shown in FIG. 5 and which shows portions of the support structure.
Figure 5B:
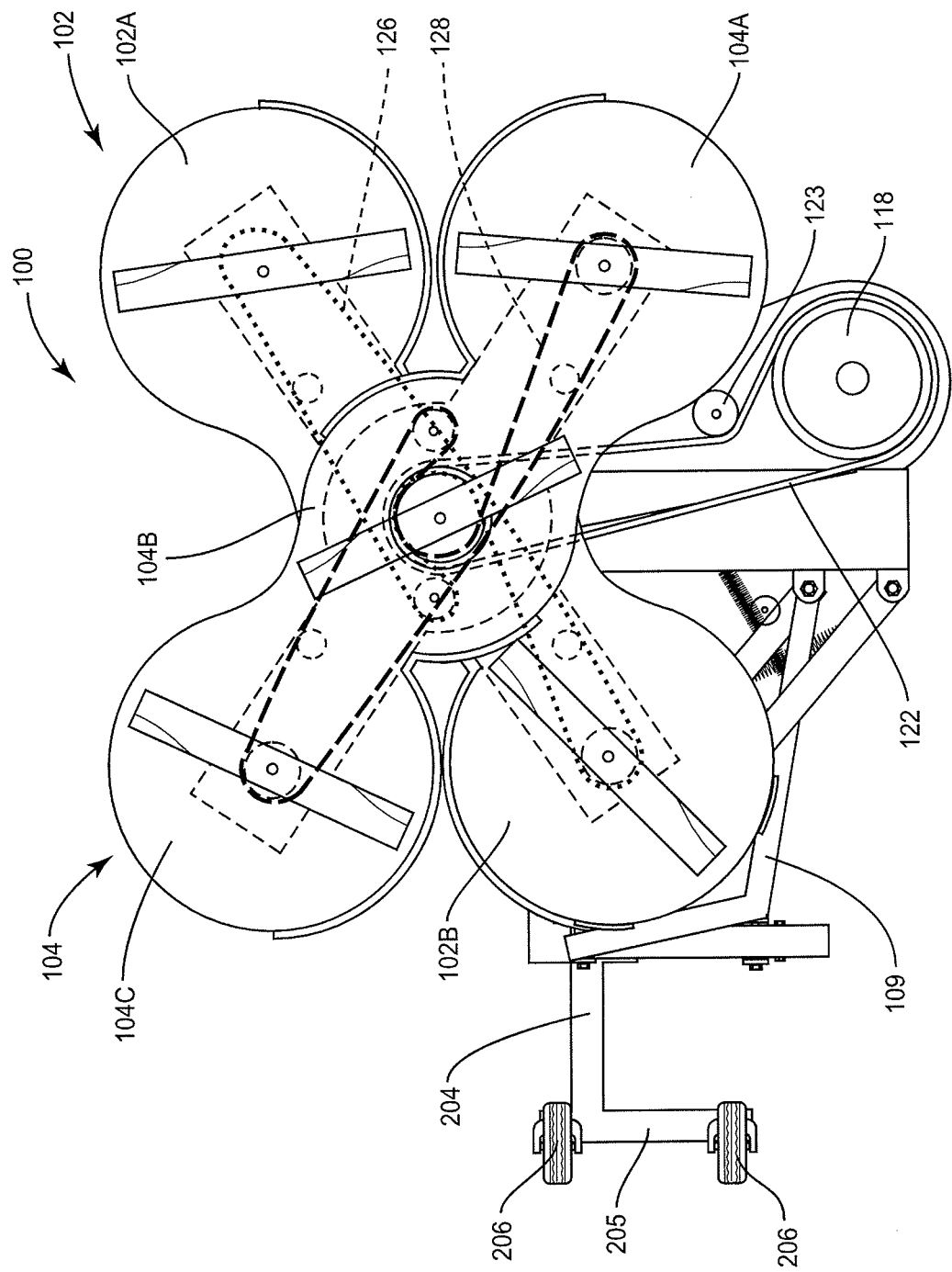
FIG. 5B is a bottom view of the mower of the second embodiment.
Figure 6A:
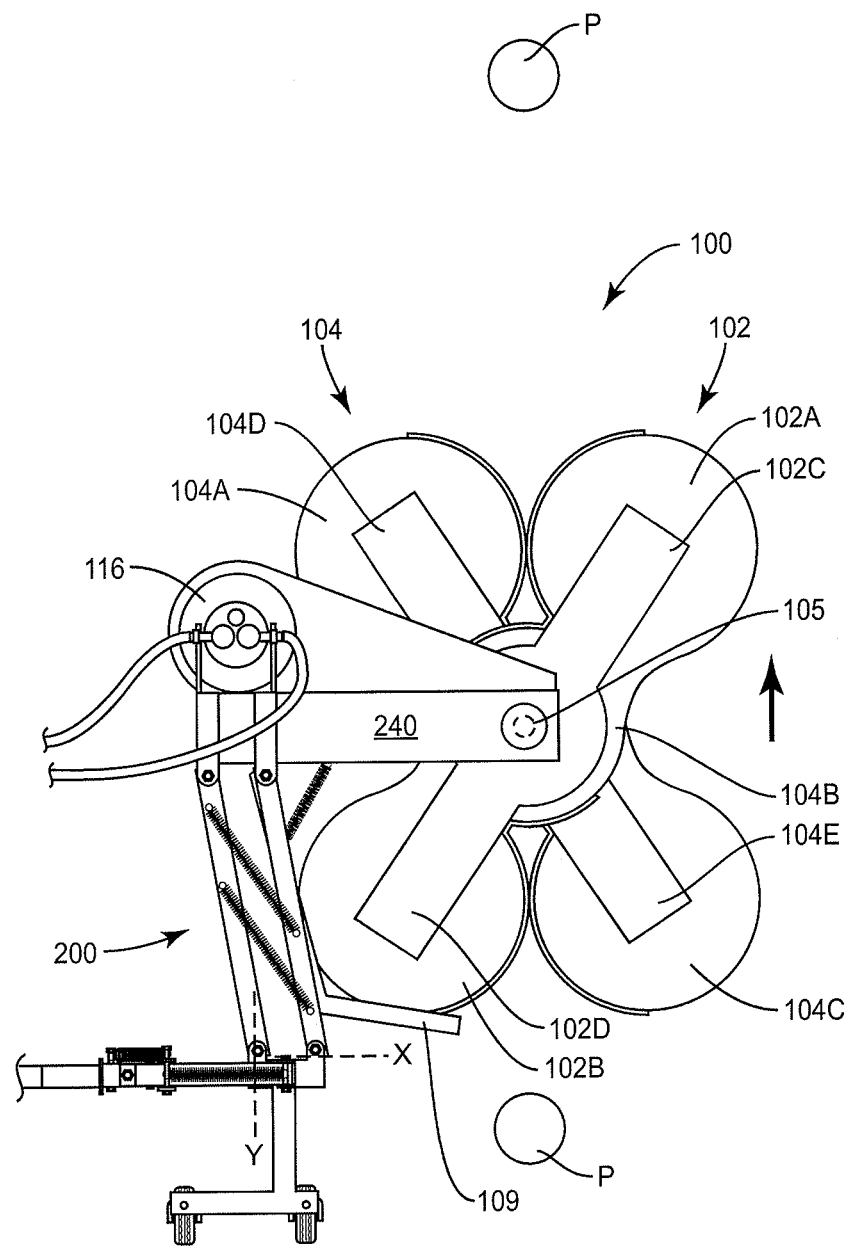
FIG. 6A is a plan view of the mower of the second embodiment approaching a post.
Figure 6B:
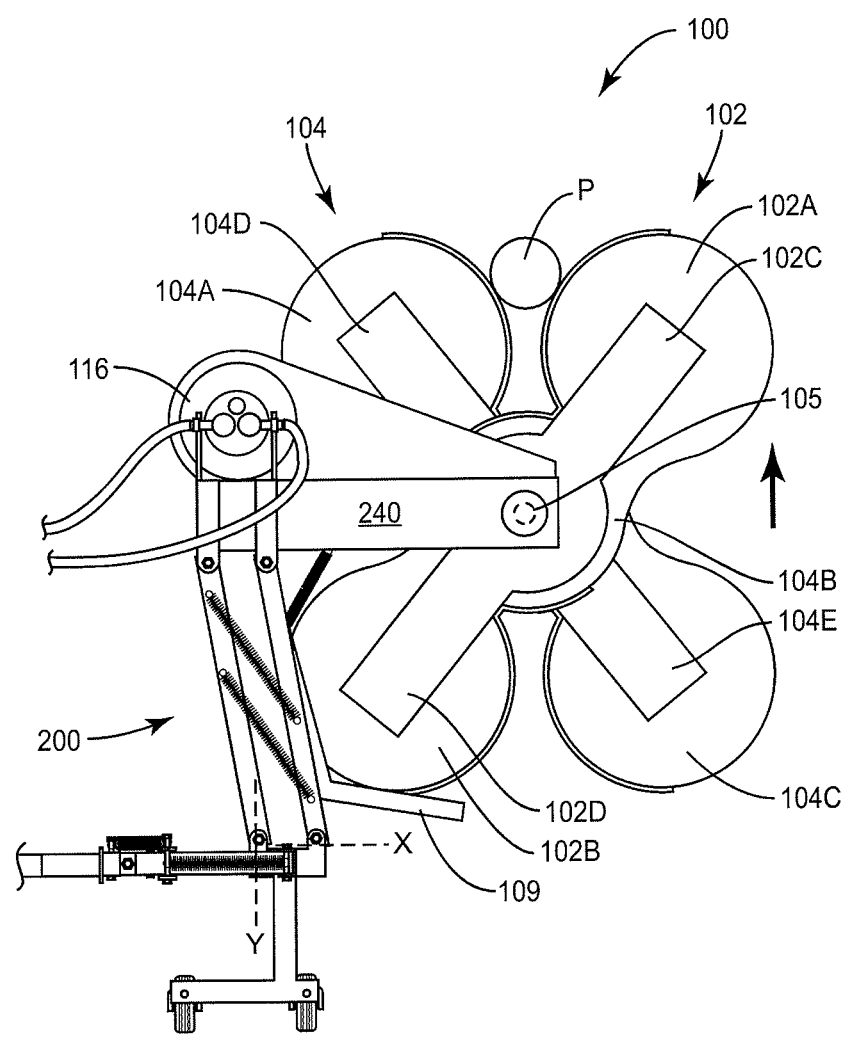
FIG. 6B is a view similar to FIG. 6A but showing the post engaging the front two mower units.
Figure 6B:
Figure 6C:
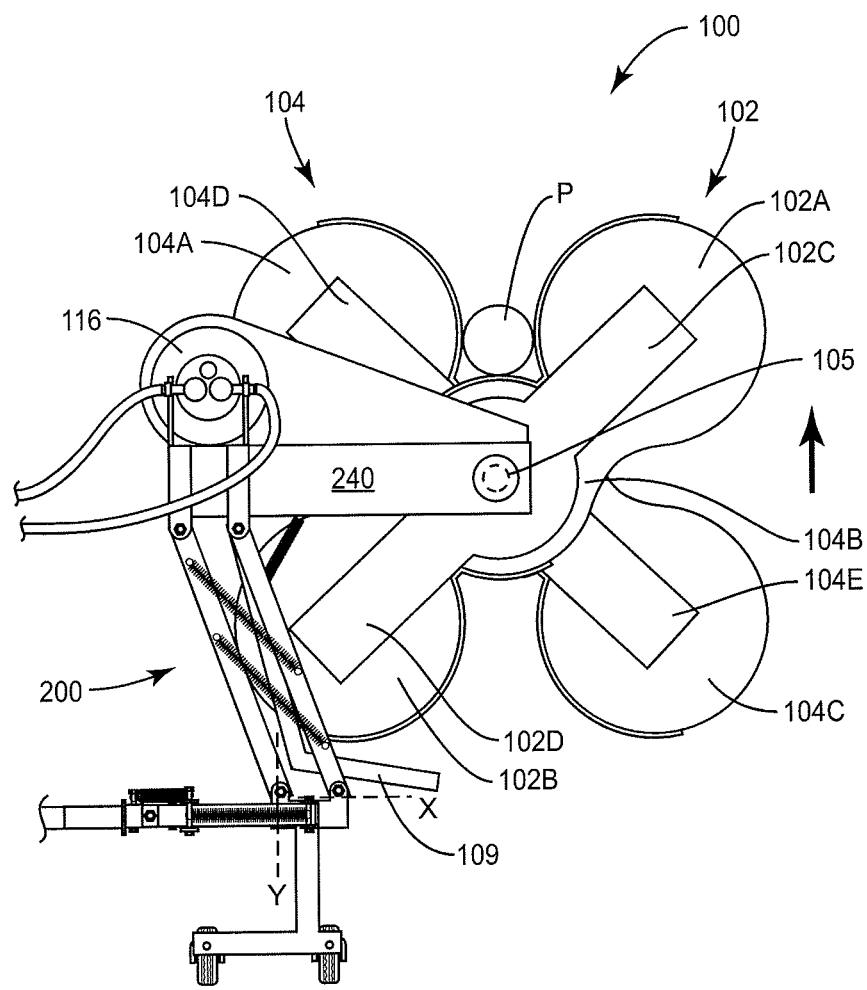
FIG. 6C is a view showing the post engaging the center mower unit.
Figure 6C:
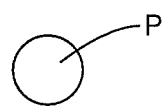
Figure 6D:
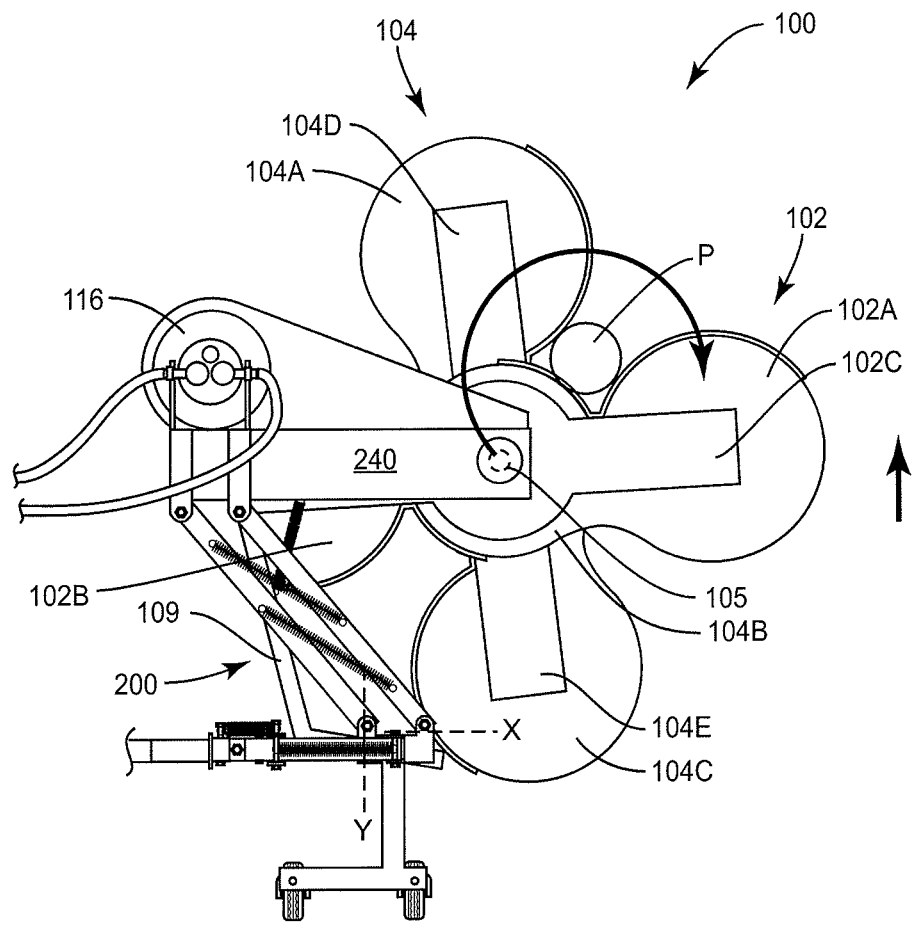
FIG. 6D is a top plan view showing the mower assembly rotating clockwise after the post has engaged the center mower unit.
Figure 6D:
Figure 6E:
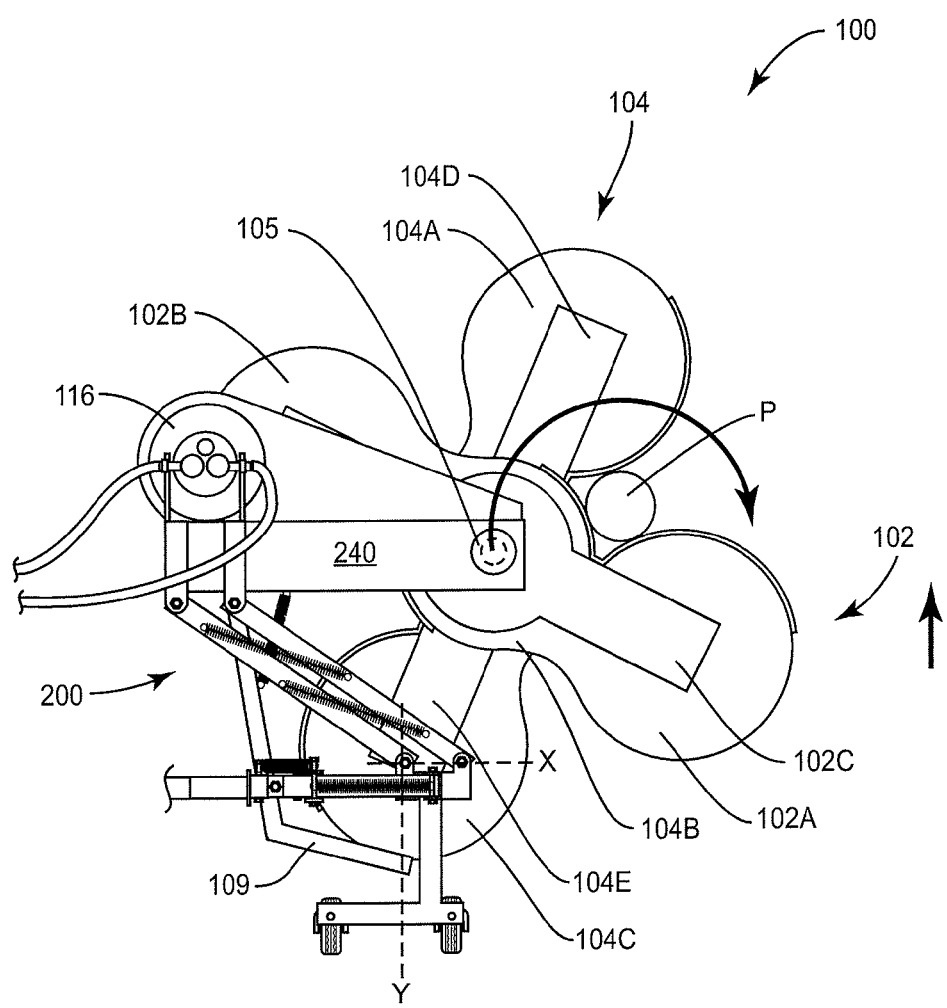
FIG. 6E shows the continued clockwise movement of the mower unit.
Figure 6E:
Figure 6F:
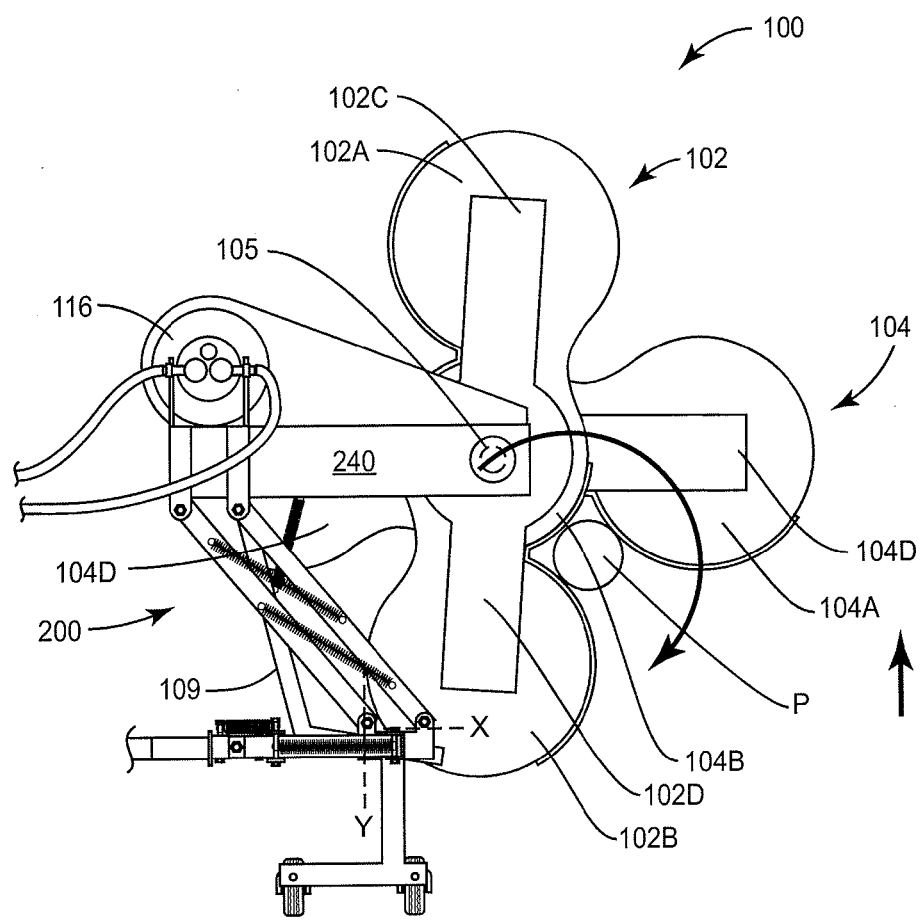
FIG. 6F shows further clockwise movement of the mower unit and with the post being at approximately the 4 o'clock position.
Figure 6F:
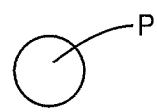
Figure 6G:
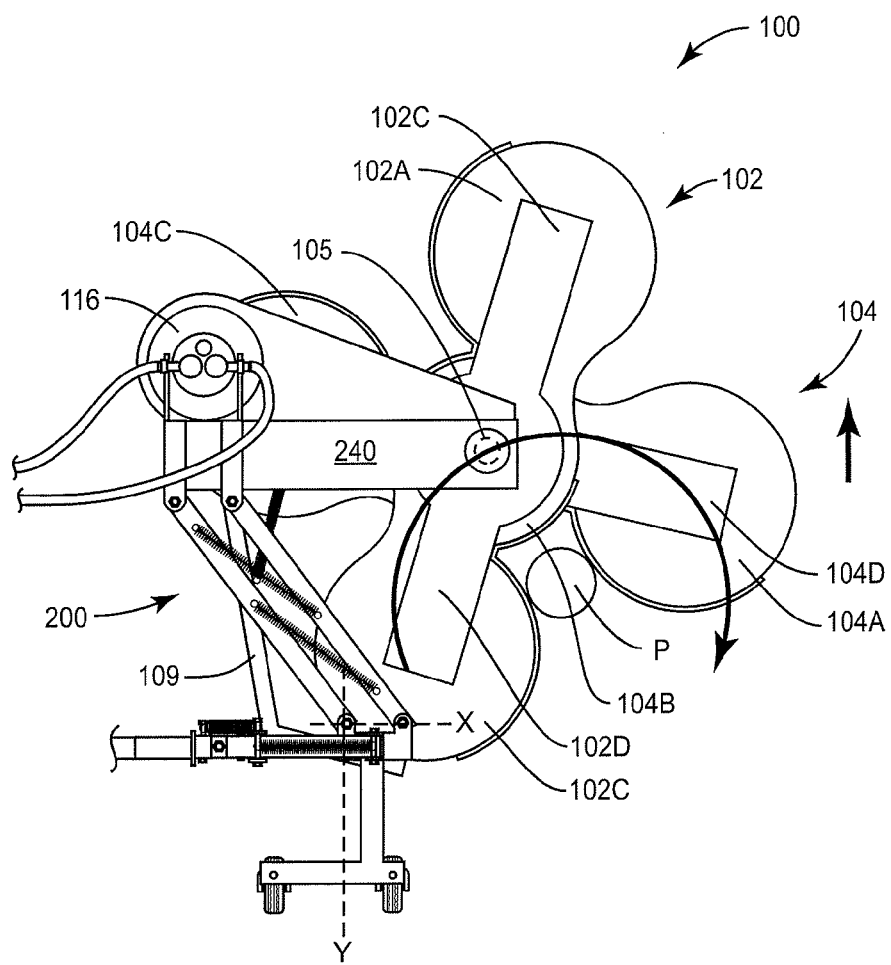
FIG. 6G shows further clockwise movement of the mower assembly relative to the position shown in FIG. 6F.
Figure 6G:
Figure 6H:
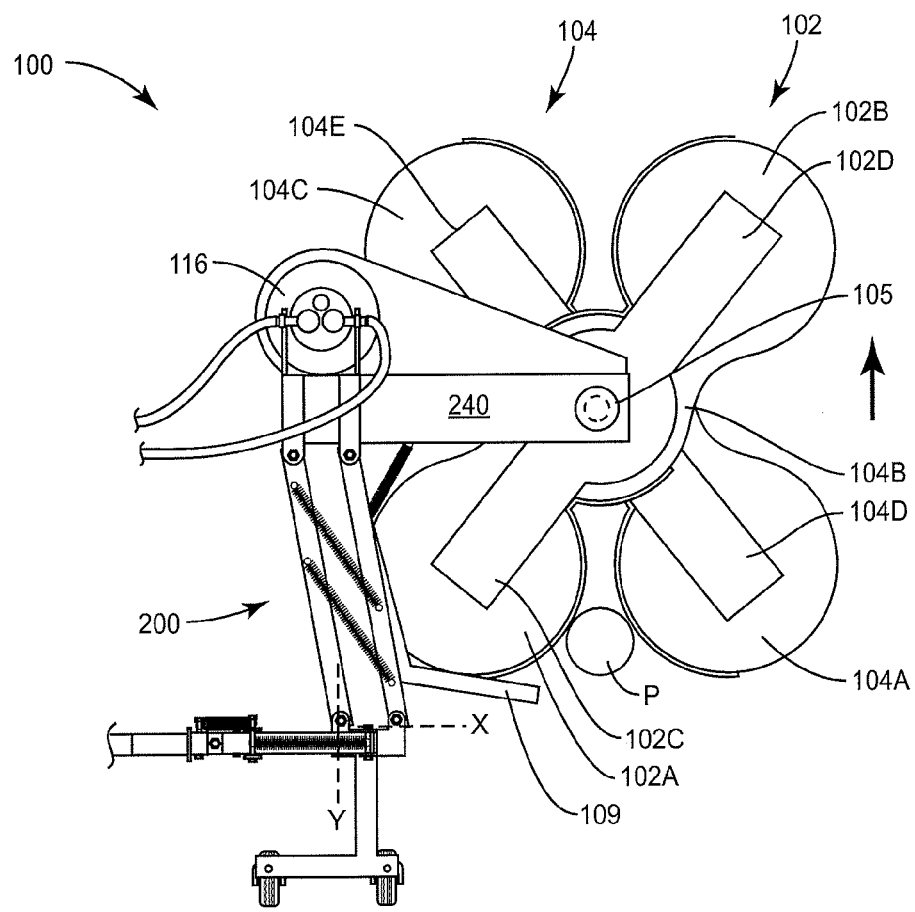
FIG. 6H shows the mower assembly after it has rotated approximately 180° and illustrates the post exiting the rear most mower units.
Figure 6H:
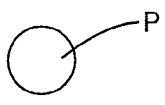
Figure 6I:
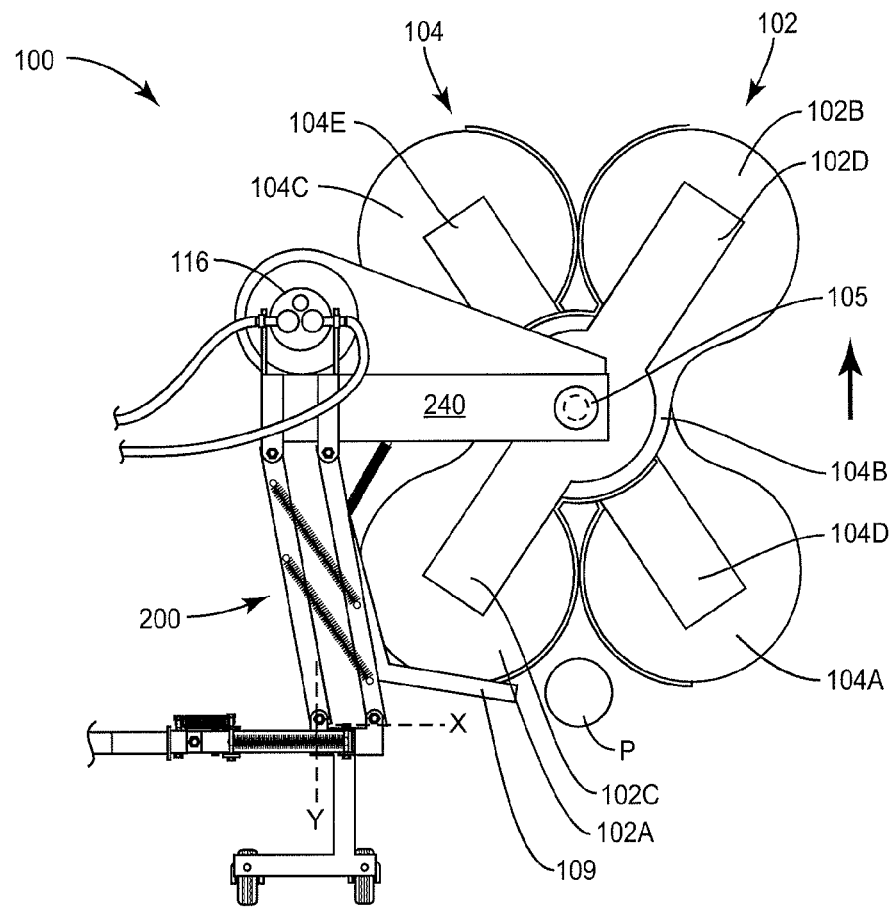
FIG. 6I is a figure similar to FIG. 6H showing the mower units in a closed position and where the post has exited the rear portion of the mower assembly.

A second embodiment for the mower is shown in FIGS. 5-6I. The mower assembly therein is indicated generally by the numeral 100. Mower assembly 100 includes a pair of mower housings 102 and 104 that are typically connected together in a scissor-life configuration. Mower housings 102 and 104 are connected together by a main central support shaft 105. See FIGS. 5A and 5B. More particularly, the mower housings 102 and 104 are journaled for rotation about the main support shaft 105. Although not particularly shown, the main support shaft 105 has three pulleys or sheaves secured thereto. There is a top sheave that is driven from an external source and there are two other pulleys or sheaves that are driven by the support shaft 105. As will be appreciated from subsequent portions of the disclosure, the mower assembly 100 is suspended in cantilever fashion from the support structure 200. The support structure 200 that will be described subsequent herein includes a support beam 240 that receives and supports the central support shaft 105. More particularly, the central support shaft 105 is journaled in the outer end portion of the beam 240. As noted above, the main support shaft 105 supports both mower housings 102 and 104 and parts thereof.

Turning to mower housing 102, it is seen that mower housing lies over the lower mower housing 104. In any event, mower housing 102 includes a first mower unit 102A. The first mower unit 102A is a peripheral mower unit. Mower unit 102A includes a shaft rotatively supported in the mower housing 102 and there is provided a driven sheave connected to the shaft and there is also provided a rotary blade connected to the shaft. In addition, mower housing 102 includes a second mower unit 102B. This is also a peripheral mower unit. Second mower unit 102B includes the same shaft, pulley and rotary blade arrangement found in the first mower unit 102A. Provided on the mower housing 102 is a pair of belt guards 102C and 102D to shield or guard a belt that is utilized to drive the rotary blades of the first and second mower units 102A and 102B.

The lower mower housing 104 includes three mower units, 104A, 104B and 104C. As seen in FIG. 5B, mower units 104A and 104C are peripheral units while mower unit 104B is deemed a central or center mower unit. There is also provided two belt guards 104D and 104E secured on the lower mower housing 104 to guard or shield a belt drive that is utilized to drive the respective rotary mower blades associated with the lower mower housing 104.

As shown in FIG. 5A, the respective peripheral mower units are shown in a closed position. The front mower units 102A and 104A are engaged as is the rear peripheral mower units 102B and 104C. See FIG. 5B. In order to maintain the mower units in a closed position, there is provided a pair of biasing springs 113 and 114. See FIG. 5A. The biasing springs 113 and 114 are interconnected between front and back portions of the mower housings 102 and 104.

Like the first embodiment shown in FIGS. 1-4, the second embodiment includes an alignment mechanism for maintaining the mower assembly 100 in a proper forward alignment such as shown in FIG. 5A. The alignment mechanism includes a control arm 109 that is pivotally connected to the support beam 240 and extends rearwardly form the support beam. A spring 111 is interconnected between the support beam 240 and the control arm 109 which tends to bias the control arm 109 towards the right as viewed in FIG. 5A. A pair of stops 109A and 109B is secured on the control arm 109 and is spaced to engage the left side of the trailing mower unit.

The mower assembly 100 is hydraulically driven. There is provided a hydraulic motor 116. See FIG. 5A. Hydraulic motor 116 is controlled by a manually actuated control valve 115 (FIG. 5). Hydraulic motor 116 drives a sheave 118 (FIG. 5B). A belt guard 119 shields a drive belt 122 which is trained around sheave 118 and drives a pulley or sheave fixed to the main shaft 105 of the mower assembly 100. As seen in FIG. 5B, an idler 123 engages drive belt 122 to maintain the belt taut. There are also two additional sheaves or pulleys secured to the main shaft 105. As seen in FIG. 5B, there are two driven belts 126 and 128 trained around these two additional pulleys or sheaves on the main shaft 105. One of the belts drives the mower units of the mower housing 102. The other belt drives the mower units of the mower housing 104. Again, there are numerous idlers that engage belts 126 and 128 as they are trained around numerous separate sheaves of the three mower units of mower housing 104.

In the embodiments illustrated herein, the mower assembly 100 is shown with a support structure 200 that is designed to attach the mower assembly to a tractor. It should be understood and appreciated that the mower assembly disclosed herein can be incorporated into a self-propelled machine. In the case of the FIG. 5 embodiment, the support structure 200 differs from the support structure associated with the FIG. 1 embodiment. In any event, the support structure 200 extending or associated with the mower assembly 100 shown in FIG. 5 is designed to attach to a tractor. With reference to FIG. 5, the support structure is indicated generally by the numeral 200 and includes a tractor mount 201. The tractor mount 201 includes two opposed plates that bolt or secure to the frame structure of the tractor.

Secured to the tractor mount 201 is a main frame structure 202. As can be seen in FIG. 5, the main frame structure 202 is a ground engaging frame structure that supports the mower assembly 100. Main frame structure 202 includes a main frame 204 that joins a cross member 205 to form a generally T-shaped structure. The cross member 205 supports a pair of wheels 206.

Supported on the main frame structure 202 is a mower lift assembly indicated generally by the numeral 210. Mower lift assembly 210 is detachably connected to the tractor. Note in FIG. 5 where the mower lift assembly 210 includes an attaching plate 212 that is attachable to the tractor. Secured to the attaching plate 212 is a lift arm support 218. Pivotally connected to the lift arm support 218 is a lift arm 214 that is also pivotally connected to a clevis or bracket structure that extends upwardly from the main frame 204. A hydraulic cylinder 216 is supported on the main frame structure 202 and is operatively connected to the lift arm 214 to raise and lower the same. The hydraulic cylinder 216 is typically powered with hydraulics associated with the tractor. There is a spring 220 interconnected between the lift arm support 218 and the lift arm 214. In addition, there is a balancing spring 222 disposed generally over the lift arm 214 which tends to support the mower assembly 100 and to maintain the wheels 206 in engagement with the ground as the mower assembly 100 traverses the ground.

Projecting forwardly from the main frame 202 is a pair of pivotally mounted control arms 230 and 232. This is best seen is FIG. 5A. Note that the control arms 230 and 232 are generally disposed in parallel relationship and are pivotally connected to other structures at opposite ends. A pair of springs 234 is interconnected between the two control arms 230 and 232. At the outer ends of the control arms 230 and 232 there is provided a pair of attaching brackets 236. Attaching brackets 236 are pivotally connected to the outer ends of the control arms 230 and 232. Attaching brackets 236 are in turn attached to the main support beam 240 which extends outwardly from the attaching brackets. Note in FIG. 5A where the main support beam 240 extends in cantilever fashion from the attaching brackets 236. As discussed before, the main support beam 240 supports the entire mower assembly 100 via the main support shaft 105. More particularly, the main support shaft 105 is rotatively journaled in the remote or outer end of the main beam 240.

The principle function of the two control arms 230 and 232 is to bias the main support beam 240 outward or in the left-to-right direction as depicted in FIG. 5A. This causes the center mower unit 104B to tend to hug a post P as the mower assembly 100 engages the post and rotates around the post.

Turning to FIG. 6A-6I, there is a sequence of plan views showing the mower assembly 100 cutting grass or other material such as vegetation around a post P. Note FIG. 6A shows the mower assembly 100 in a normal position not engaged with a post P. In this normal position, the mower assembly is aligned with an oncoming post P. Note that the wheels 206 are aligned with the direction of travel as illustrated by the outer arrow. However, in this case, the control arms 230 and 232 are slightly angled.

FIG. 6B shows the mower assembly 100 engaging the oncoming post P. Here the post P has engaged mower units 102A and 104A and has caused them to be slightly spread. As discussed above, the mower housings 102 and 104 are biased towards a closed position such as shown in FIG. 6A. As the post engages the mower units 102A and 104A, the post causes the mower units to move from the closed position towards an open position. As the mower assembly 100 is further advanced towards the post P, it is seen that the post will eventually cause the mower units 102A and 104A to assume their open position. This is shown in FIG. 6C. At this position, the post has engaged the center most mower unit 104B. Note that in this position the control arms 230 and 232 have pivoted slightly from the position shown in FIG. 6B. In particular, the forward portions of the arms 230 and 232 have moved more to the left as viewed in FIG. 6C. This means that the main beam 240 and the mower unit 100 have moved slightly to the left compared to the position that these components assumed in FIG. 6B.

As the mower unit 100 moves forward from the position shown in FIG. 6C, the engagement of the post P with the central portion of the mower assembly will cause the mower assembly to bodily rotate clockwise. This is shown in FIG. 6D. As the mower assembly 100 rotates, the respective mower units 102A, 104A and 104B will cut grass or other material around the post P. Note also in FIG. 6D where the main support beam 240 is further shifted to the left. Thus as the mower assembly 100 rotates clockwise, the beam 240 moves to the left and hence the control arms 230 and 232 pivot to the position shown in FIG. 6D. All the time the control arm 230 and 232 are biasing the main beam 240 to the right and urging the center mower unit 104B to engage and hug the post P as the mower assembly 100 rotates around the post.

In FIG. 6E, the mower assembly 100 has further rotated clockwise. Again in the process mower unites 102A, 104A and 104B have continued to cut grass and other material lying around the post P. Control arms 230 and 232 have further rotated in response to the mower assembly engaging the post and rotating around the post. Still the control arms 230 and 232 effectively bias the main beam 240 towards the right as viewed in FIG. 6E such that the mower assembly 100 is caused to hug the post P during the course of its rotation.

In FIG. 6F, the mower assembly 100 has further rotated to where the post lies at approximately the 4 o'clock position. Here the mower unit 102A lies at approximately the 6 o'clock position and mower unit 104A lies at approximately the 3 o'clock position. Once the post lies past the 3 o'clock position, the control arms 230 and 232 tend to move back in the opposite direction as the biasing effect of the arms causes the mower assembly 100 and the main support beam 240 to move to the right as viewed in FIG. 6F.

In FIG. 6G, the mower assembly 100 has rotated to where the post is generally halfway between the 3 o'clock position and the 6 o'clock position. Again, it is noted that the control arm 230 and 232 are tending to rotate to the right and the mower assembly and main support beam 240 are also being moved to the right causing the mower assembly 100 to continue to engage and mow around the post P.

In FIG. 6H, the mower units 102A and 104A have rotated bodily approximately 180°. The post P is still being contacted by mower units 102A and 104A but are about to exit from between the two mower units as the mower assembly 100 moves forward.

FIG. 6I shows the post P having exited from between mower units 102A and 102B. Note that after the post has exited the mower units 102A and 102B that the springs 113 and 114 causes the mower units 102A and 104A to move to their closed position. At this time the control arms 230 and 232 assume essentially the same position shown in FIG. 6A. Note that mower units 102B and 104C have now assumed the forward most position and are properly positioned to receive the next succeeding post.

Therefore, it follows that as each post is contacted by the mower assembly 100 that the two leading mower units will engage and cooperate to cut grass or other vegetation around the post P. As the entire mower assembly rotates, the two leading mower units will effectively circle the post and the rotary blades forming a part of the mower units will cut extremely close to the post P. In the embodiment illustrated, the post is effectively encircled by the two leading mower units and the central mower unit 104B. It should be appreciated, however, that the central mower unit 104B may not be essential to achieving a complete cut around the post P. It is believed that two peripheral mower units such as mower units 102A and 104A, through cooperation, will effectively cut grass and other vegetation very close to the post P without the need of a third central mower unit.

One of the advantages of the mower assembly 100 of the present invention lies in providing at least four mower units. This is because once two mower units have engaged a post and cut around the post, then the other two mower units, through bodily rotation, have been positioned forwardly in the mower assembly 100 such that they are ready to take on the next succeeding post. This greatly increases the efficiency of the mower assembly 100 and decreases the rotation cycles required for a given number of posts P.

At various places in the specification and claims, it is stated that the mower assembly 100 is bodily rotatable. In some cases it is noted that the mower assembly or a mower unit is bodily rotatable relative to the support structure or that the mower units are bodily rotatable about a post. This means that the mower assembly or the mower units rotate as a unit.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A rotary mower system that has the capability of cutting grass or other material around posts, comprising:
    a support structure;
    a mower assembly rotatably mounted to the support assembly and bodily rotatable 360° about an axis;
    the mower assembly including:
        i. a first mower housing having first and second mower units with each mower unit having a rotary blade;
        ii. the first mower housing being rotatable about the axis;
        iii. a second mower housing having third and fourth mower units where each mower unit includes a rotary blade;
        iv. the second mower housing being rotatable about the axis;
        v. wherein the first mower housing is rotatable relative to the second mower housing and wherein the two mower housings are moveable between a closed position and an open position;
        vi. a biasing structure operatively connected to the first and second mower housings for biasing the first and second mower housing towards the closed position and wherein the biasing structure permits the first and second mower housings to move from the closed position to the open position in response to the post passing between the first and second mower housings; and
        vii. the mower assembly configured to engage a first post and rotate approximately 180° such that during the rotation the first and second mower units engage the first post and cut grass around the first post, and wherein in the course of rotating the approximately 180°, the mower assembly positions the third and fourth mower units to engage a second post, and wherein the mower assembly, in response to engaging the second post, rotates another approximately 180° and during this rotation the third and fourth mower units engage the second post and cut grass around the second post.

2. The rotary motor system of claim 1 wherein the support structure includes a moveable support arm that supports the mower assembly in cantilever fashion and is moveable laterally back and forth as the mower assembly rotates about the axis.

3. The rotary mower system of claim 2 wherein the support structure further includes a ground engaging frame and wherein the moveable support arm is operatively connected to the ground engaging frame and projects therefrom.

4. A rotary mower system for cutting grass around posts comprising:
    a support structure;
    a mower assembly pivotally mounted to the support structure and rotatable as a unit about an axis;
    the mower assembly including first, second, third and fourth mower units with each mower unit having a rotary blade; and the mower assembly configured to engage a first post and rotate approximately 180° such that during the rotation the first and second mower units engage the first post and cut grass around the first post, and wherein in the course of rotating the approximately 180°, the mower assembly positions the third and fourth mower units to engage a second post, and wherein the mower assembly, in response to engaging the second post, rotates another approximately 180° and during this rotation the third and fourth mower units engage the second post and cut grass around the second post.

5. The rotary mower system of claim 4 wherein the mower assembly includes a fifth mower unit disposed generally between the first, second, third and fourth mower units and which cooperates with the first, second, third and fourth mower units to cut grass around the respective posts.

6. The rotary mower system of claim 4 wherein at least a portion of the support structure having the mower assembly supported thereby is moveable in response to the mower assembly engaging one of the posts such that as the mower assembly rotates, the mower assembly also moves at least slightly generally laterally.

7. The rotary mower system of claim 4 wherein the first and second mower units form a part of a first mower housing and wherein the third and fourth mower units form a part of a second mower housing, and wherein the first and second mower housings are secured together in a scissors configuration.

8. The rotary mower system of claim 4 wherein the first and second mower units are biased to a closed position and configured to receive the first post therebetween wherein when the first post moves between the first and second mower units, the first and second mower units move to an open position; and wherein the third and fourth mower units are biased to a closed position and wherein when the second post moves between the third and fourth mower units, the third and fourth mower units move to an open position such that the second post can move between the third and fourth mower unit.

* * * * *